US011444672B2

(12) United States Patent
Berger et al.

(10) Patent No.: US 11,444,672 B2
(45) Date of Patent: Sep. 13, 2022

(54) ANTENNA SWITCH DIVERSITY OR CYCLIC DELAY DIVERSITY SELECTION

(71) Applicant: QUALCOMM Incorporated, San Diego, CA (US)

(72) Inventors: Peer Berger, Hod Hasharon (IL); Shay Landis, Hod Hasharon (IL); Moshe Ben-Ari, Rehovot (IL); Assaf Touboul, Netanya (IL); Amit Bar-Or Tillinger, Tel-Aviv (IL); Michael Levitsky, Rehovot (IL); Cheol Hee Park, San Diego, CA (US); Haim Weissman, Haifa (IL); Jungsik Park, San Diego, CA (US); In Hyuck Yeo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/202,922

(22) Filed: Mar. 16, 2021

(65) Prior Publication Data

US 2021/0288709 A1   Sep. 16, 2021

Related U.S. Application Data

(60) Provisional application No. 62/990,398, filed on Mar. 16, 2020.

(51) Int. Cl.
*H04B 7/06* (2006.01)
*H04L 5/00* (2006.01)

(52) U.S. Cl.
CPC ......... *H04B 7/0671* (2013.01); *H04B 7/0602* (2013.01); *H04B 7/0689* (2013.01); *H04L 5/0023* (2013.01)

(58) Field of Classification Search
CPC .. H04B 7/0632; H04B 7/0413; H04B 7/0671; H04B 7/0689; H04B 7/0602; H04L 5/0023; H04L 2025/03426
See application file for complete search history.

(56) References Cited

U.S. PATENT DOCUMENTS

| 2008/0039030 A1 | 2/2008 | Khan et al. |
| 2011/0143696 A1 | 6/2011 | Luo et al. |

(Continued)

FOREIGN PATENT DOCUMENTS

| CN | 102237913 | * 8/2015 | ............... H04B 7/06 |
| CN | 102237913 B | 8/2015 | |
| WO | 2018228486 A1 | 12/2018 | |

OTHER PUBLICATIONS

International Search Report and Written Opinion—PCT/US2021/022578—ISA/EPO—dated Jun. 9, 2021.

*Primary Examiner* — Rahel Guarino
(74) *Attorney, Agent, or Firm* — Loza & Loza, LLP/Qualcomm Incorporated

(57) ABSTRACT

Aspects relate to mechanisms for a wireless communication device to select between a cyclic delay diversity mode and an antenna switch diversity mode for transmission of a signal based on at least one parameter associated with communication over a wireless channel. The parameter(s) may include a channel estimation parameter associated with the wireless channel, a communication parameter associated with at least one communication on the wireless channel, or a combination thereof.

24 Claims, 12 Drawing Sheets

(56) References Cited

U.S. PATENT DOCUMENTS

| | | | |
|---|---|---|---|
| 2011/0194551 A1* | 8/2011 | Lee | H04B 7/0626 |
| | | | 370/342 |
| 2012/0076087 A1* | 3/2012 | Muquet | H04W 52/42 |
| | | | 370/329 |
| 2013/0242794 A1* | 9/2013 | Liu | H04W 72/085 |
| | | | 370/252 |
| 2021/0153063 A1* | 5/2021 | Zhang | H04L 45/24 |

* cited by examiner

ID
ANTENNA SWITCH DIVERSITY OR CYCLIC DELAY DIVERSITY SELECTION

The present Application for patent claims priority to and the benefit of U.S. Provisional Application No. 62/990,398, filed Mar. 16, 2020, and assigned to the assignee hereof and hereby expressly incorporated by reference herein as if fully set forth below in its entirety and for all applicable purposes.

TECHNICAL FIELD

The technology discussed below relates generally to wireless communication networks, and more particularly, to selecting between antenna switch diversity and cyclic delay diversity in a wireless communication device.

INTRODUCTION

In a wireless communication network, a user equipment (UE) including multiple transmit chains may operate in a cyclic delay diversity (CDD) mode or an antenna switch diversity mode. In CDD mode, the UE may simultaneously transmit on each of the transmit chains using a cyclic delay to produce signals with different cyclic phase/delay on the different transmit chains. In antenna switch diversity mode, the UE may transmit using one of the transmit chains, and the selected transmit chain may be switched between different antennas.

The UE may be configured to implement CDD and/or antenna switch diversity in a cellular network or a device to device (D2D) network. In a D2D network, UEs may signal one another directly, rather than via an intermediary base station or cell. D2D communication networks may utilize direct signaling (e.g., sidelink signaling) to facilitate direct communication between UEs. In some D2D configurations, UEs may further communicate in a cellular system, generally under the control of a base station. Thus, the UEs may be configured for uplink and downlink signaling via a base station and further for sidelink signaling directly between the UEs without transmissions passing through the base station.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication at a wireless communication device is disclosed. The method includes obtaining at least one parameter associated with communication by the wireless communication device over a wireless channel. The at least one parameter can include a channel estimation parameter associated with the wireless channel, a communication parameter associated with at least one communication on the wireless channel, or a combination thereof. The method further includes selecting a transmission mode based on the at least one parameter. The transmission mode can include one of an antenna switch diversity mode or a cyclic delay diversity (CDD) mode. The method further includes transmitting a signal using the selected transmission mode.

Another example provides a wireless communication device in a wireless communication network including a transceiver, a memory, and a processor communicatively coupled to the wireless transceiver and the memory. The processor and the memory can be configured to obtain at least one parameter associated with communication by the wireless communication device over a wireless channel. The at least one parameter includes a channel estimation parameter associated with the wireless channel, a communication parameter associated with at least one communication on the wireless channel, or a combination thereof. The processor and the memory can further be configured to select a transmission mode based on the at least one parameter. The transmission mode can include one of an antenna switch diversity mode or a cyclic delay diversity (CDD) mode. The processor and the memory can further be configured to transmit a signal using the selected transmission mode via the transceiver.

Another example provides a wireless communication device in a wireless communication network. The wireless communication device includes means for obtaining at least one parameter associated with communication by the wireless communication device over a wireless channel. The at least one parameter can include a channel estimation parameter associated with the wireless channel, a communication parameter associated with at least one communication on the wireless channel, or a combination thereof. The wireless communication device further includes means for selecting a transmission mode based on the at least one parameter. The transmission mode can include one of an antenna switch diversity mode or a cyclic delay diversity (CDD) mode. The wireless communication device further includes means transmitting a signal using the selected transmission mode.

Another example provides an article of manufacture for use by a wireless communication device in a wireless communication network. The article includes a non-transitory computer-readable medium having stored therein instructions executable by one or more processors of the wireless communication device to obtain at least one parameter associated with communication by the wireless communication device over a wireless channel. The at least one parameter can include a channel estimation parameter associated with the wireless channel, a communication parameter associated with at least one communication on the wireless channel, or a combination thereof. The non-transitory computer-readable medium further has stored therein instructions executable by the one or more processors of the wireless communication device to select a transmission mode based on the at least one parameter. The transmission mode can include one of an antenna switch diversity mode or a cyclic delay diversity (CDD) mode. The non-transitory computer-readable medium further has stored therein instructions executable by the one or more processors of the wireless communication device to transmit a signal using the selected transmission mode.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

Figure 1:
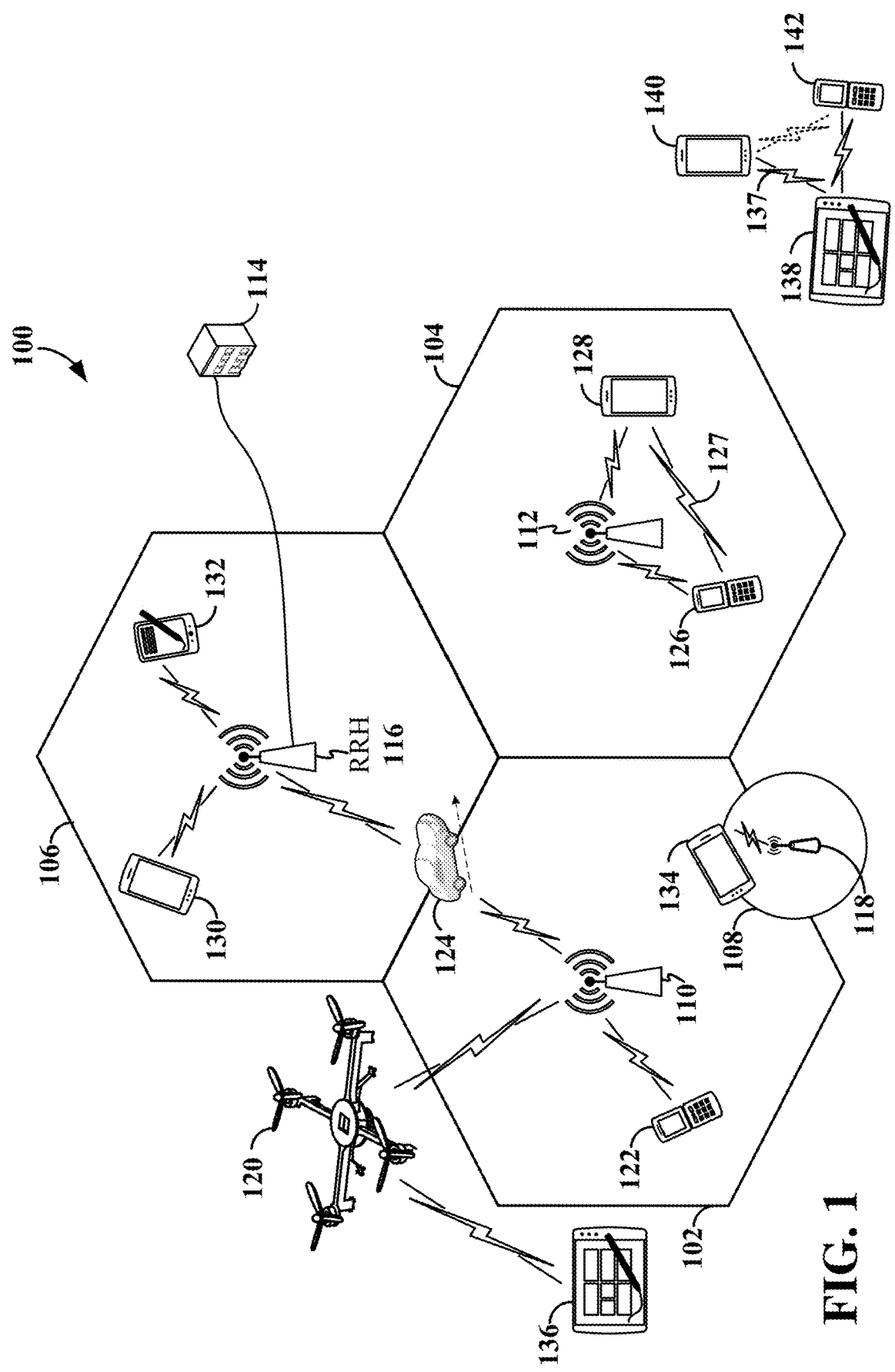
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects relate to selection between a cyclic delay diversity (CDD) mode and an antenna switch diversity (ASD) mode for transmission of a signal by a wireless communication device (e.g., a UE). The signal may be transmitted, for example, on a sidelink to another wireless communication device (e.g., another UE). Either the CDD mode or ASD mode may be selected, for example, based on at least one parameter associated with communication over a wireless channel. The parameter(s) may include a channel estimation parameter associated with the wireless channel, a communication parameter associated with at least one communication on the wireless channel, or a combination thereof.

For example, the channel estimation parameter may include one or more of a Doppler spread, a delay spread, an antenna imbalance between at least a first antenna and a second antenna of the wireless communication device, or an antenna correlation between at least the first antenna and the second antenna. In some examples, the ASD mode may be selected when the antenna imbalance is less than a first threshold, the antenna correlation is greater than or equal to a second threshold, the Doppler spread is less than a third threshold, or the delay spread is less than a fourth threshold. In some examples, the CDD mode may be selected when the antenna imbalance is greater than or equal to the first threshold, the antenna correlation is less than the second threshold, the Doppler spread is greater than or equal to the third threshold, or the delay spread is greater than or equal to the fourth threshold.

For example, the communication parameter may include one or more of a modulation and coding scheme (MCS) or an allocated resource block (RB) size. In some examples, the ASD mode may be selected when the MCS is less than a threshold and the CDD mode may be selected when the MCS is greater than or equal to the threshold. In some examples, the ASD mode may be selected when the allocated RB size is less than a threshold, and the CDD mode may be selected when the allocated RB size is greater than or equal to the threshold.

In some examples, the transmission mode may be selected based on a value of the at least one parameter obtained over time. In some examples, the transmission mode may be selected based on respective weights applied to each of the at least one parameter.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
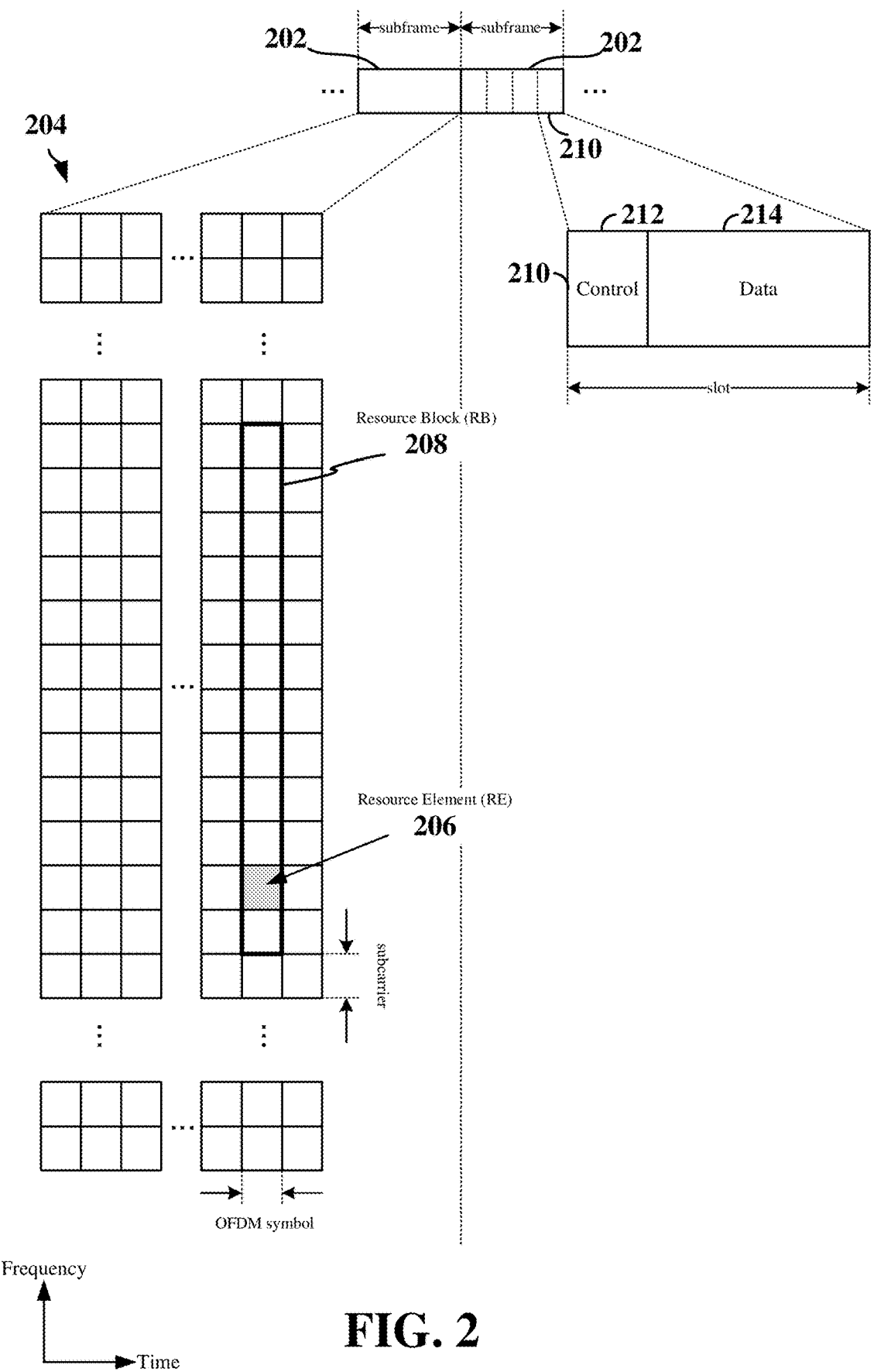
FIG. 2 is a diagram illustrating an example of a frame structure for use in a wireless communication network according to some aspects.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS);

and a synchronization signal block (SSB). SSBs may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
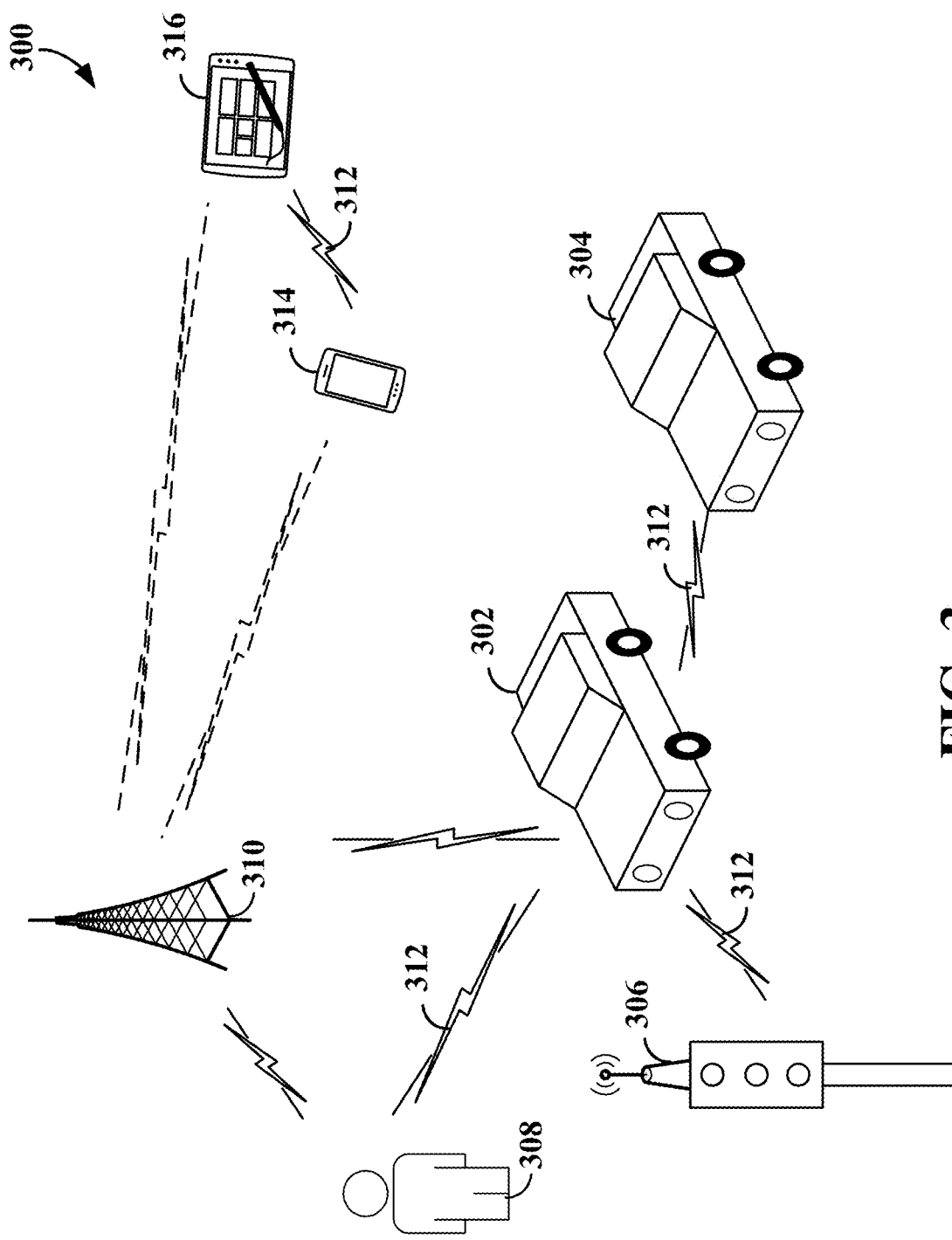
FIG. 3 is a diagram illustrating an example of a wireless communication network employing sidelink communication according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/ or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. The base station 310 may further activate preconfigured sidelink grants (e.g., configured grants) for sidelink communication among the sidelink devices. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may also be transmitted on the PSCCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

Figure 4:
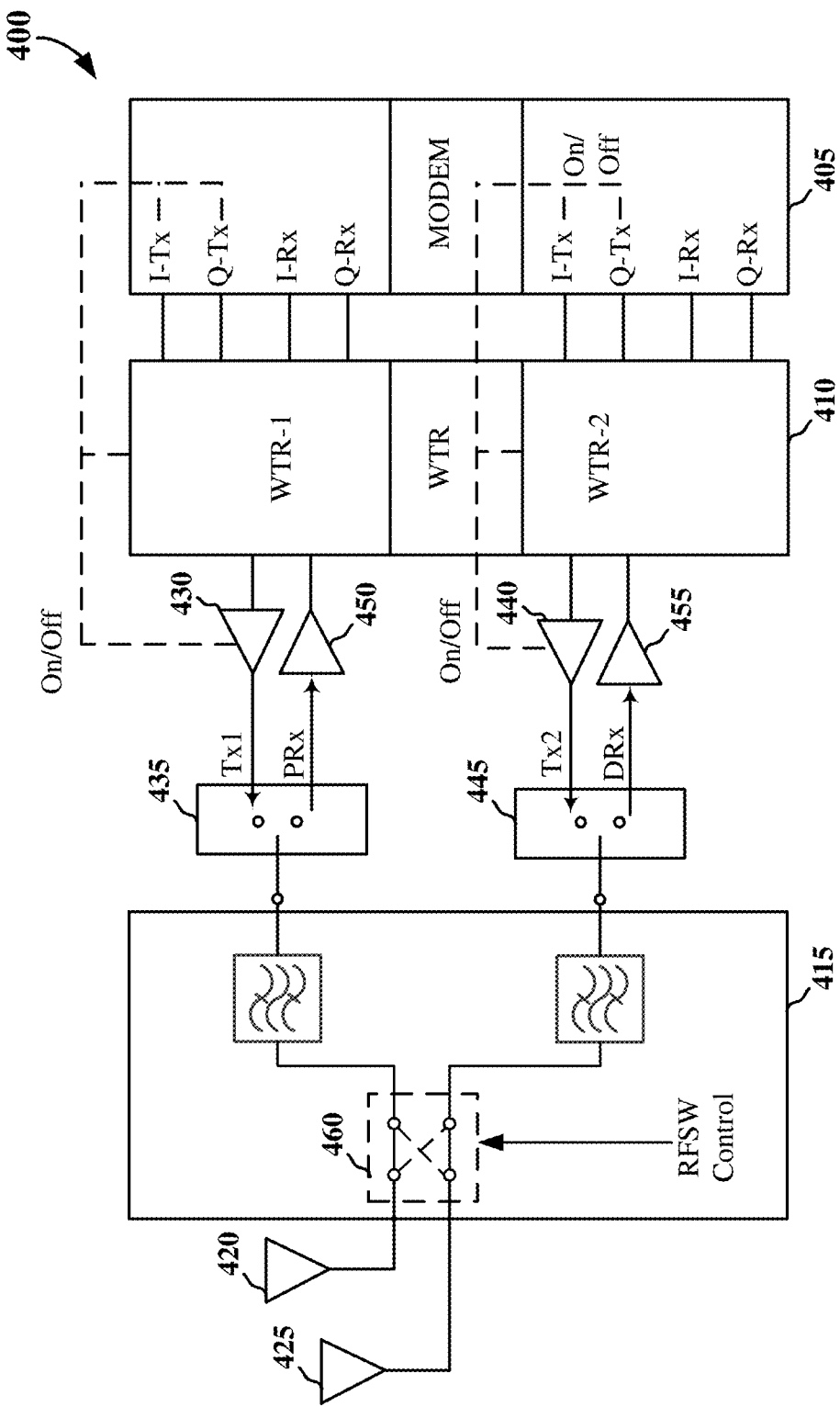
FIG. 4 is a diagram illustrating an example of a wireless communication device configured to support both CDD and antenna switch diversity according to some aspects.

In some examples, a UE may be configured with multiple transmit chains and antennas and may further operate in a cyclic delay diversity (CDD) mode or an antenna switch diversity mode. In CDD mode, the UE may simultaneously transmit on each of the transmit chains using a cyclic delay to produce signals with different cyclic phase/delay on the different transmit chains. In antenna switch diversity mode, the UE may transmit using one of the transmit chains, and the selected transmit chain may be switched between different antennas. FIG. 4 is a diagram illustrating an example of a wireless communication device (e.g., a UE) 400 configured to support both CDD and antenna switch diversity at the modem level. In some examples, the UE 400 may be configured to communicate in a sidelink (e.g., C-V2X and/or D2D) network and/or a cellular network. In some examples, the UE 400 may correspond to any of the UEs or sidelink devices illustrated in FIGS. 1 and/or 3.

The UE 400 may include a modem 405, a transceiver 410 (e.g., a wireless transmitter/receiver (WTR)), a radio frequency (RF) front-end 415, a first antenna 420, and a second antenna 425. Collectively, the modem 405, transceiver 410, RF front-end 415, first antenna 420, and second antenna 425 may form a first transceiver chain and a second transceiver chain. That is, the components of UE 400 may be configured as a first transmit chain coupled to the first antenna 420 and a second transmit chain coupled to the second antenna 425 during the transmission of signals (e.g., sidelink or uplink signals). Similarly, the components of UE 400 may be configured as a first receive chain coupled to the first antenna 420 and a second receive chain coupled to the second antenna 425 during the reception of signals (e.g., sidelink or downlink signals). In some examples, the UE 400 may further included additional antennas (not shown).

More particularly, the first transmit chain may include a first portion of the modem 405 receiving a data stream or bitstream representative of information for transmission. The first portion of the modem 405 may include various components such as, but not limited to, serial-to-parallel (S/P) converter, a mapper, an interleaver, an encoder, a modulator, and the like, which are configured to process the bitstream for transmission. The output of the first portion of the modem 405 may include in-phase transmit (I Tx) and quadrature (Q Tx) streams that are fed into a first portion of the transceiver 410. In some aspects, the functions performed by the first portion of the modem 405 may be considered baseband processing.

The first portion of the transceiver 410 includes various components such as, but not limited to, oscillator(s), mixer(s), filter(s), and the like, that are configured to process the I/Q bitstreams (information), convert the information from a baseband frequency to an intermediate frequency (IF), in some examples, and subsequently into a RF for transmission. The output of the first portion of the transceiver 410 is fed into a power amplifier 430 which amplifies the RF signal and then feeds the amplified signal into an Tx/Rx switch 435 (which is in electronic communication with the power amplifier 430). In some examples, the Tx/Rx switch 435 may be integrated into the RF front-end 415.

Similarly, the second transmit chain may include a second portion of the modem 405 receiving a data stream or bitstream representative of information for transmission. The second portion of the modem 405 may include various components such as, but not limited to, S/P converter, a mapper, an interleaver, an encoder, a modulator, and the like, which are configured to process the bitstream for transmission. The output of the second portion of the modem 405 may include I Tx and Q Tx streams that are fed into a second portion of the transceiver 410. In some aspects, the functions performed by the second portion of the modem 405 may be considered baseband processing.

The second portion of the transceiver 410 includes various components such as, but not limited to, oscillator(s), mixer(s), filter(s), and the like, that are configured to process the I/Q bitstreams (information), convert the information from a baseband frequency to an IF, in some examples, and subsequently into a RF for transmission. The output of the second portion of the transceiver 410 is fed into a power amplifier 440 which amplifies the RF signal and then feeds the amplified signal into a Tx/Rx switch 445 (which is in electronic communication with the power amplifier 440). In some examples, the Tx/Rx switch 445 may be integrated into the RF front-end 415.

Receive operations may generally include the reverse operations with respect to the first transmit chain and second transmit chains. For example, a signal received at the first antenna 420 may be fed, via the first portion of the RF front-end 415, into Tx/Rx switch 435 (which is switched from the transmit position to the primary receive (PRx) position) and fed into low noise amplifier 450 for amplification. The amplified signal is then fed into the first portion of the transceiver 410 for down-conversion (among other functions) into a baseband signal. The baseband signal is fed, in I/Q streams, into the first portion of the modem 405 for data recovery.

Similarly, a signal received at the second antenna 425 may be fed, via the second portion of the RF front-end 415, into Tx/Rx switch 445 (which is switched from the transmit position to the discontinuous receive (DRx) position) and fed into low noise amplifier 455 for amplification. The amplified signal is then fed into the second portion of the transceiver 410 for down-conversion (among other functions) into a baseband signal. The baseband signal is fed, in I/Q streams, into the second portion of the modem 405 for data recovery.

In one example, the RF front-end 415 includes an optional antenna switch 460 configured to switch the output of the first transmit chain and/or the second transmit chain between the first antenna 420 and the second antenna 425 based on an RF switch control signal (RFSW control) generated, for example, by the modem 405. This configuration supports the UE 400 operating in both an antenna switch diversity mode and a CDD mode.

In this example, the antenna switch diversity mode includes the UE 400 activating the first transmit chain (while deactivating the second transmit chain) for transmission of a first portion of the signal (e.g., a first subframe) via the first antenna 420, and then switching the first transmit chain from the first antenna 420 to the second antenna 425 for transmission of a second portion of the signal (e.g., a second subframe) via the second antenna 425. This antenna switching pattern may be repeated (e.g., the first transmit chain is switched between the first antenna 420 and the second antenna 425) for the transmission.

The CDD mode includes the UE 400 activating the first transmit chain coupled to the first antenna 420 and the second transmit chain coupled to the second antenna 425 concurrently using the antenna switch 460. The first and second transmit chains both transmit signals simultaneously with cyclic delay (different phase delay) between the signals. Switching between CDD mode and the antenna switch diversity mode may be on a per-subframe or slot basis and based on various performance metrics (e.g., modulation and coding scheme (MCS), resource block (RB) allocation, Doppler properties, and the like).

In another example, the antenna switch 460 may be removed. In this example, the first transmit chain (and first receive chain during receive operations) may be directly coupled to the first antenna 420 and the second transmit chain (and the second receive chain during receive operations) may be directly coupled to the second antenna 425. The UE 400 may implement the antenna switch diversity mode and the CDD mode at the modem 405, transceiver 410, and/or power amplifier 430/440 level.

For example, the UE 400 may be configured to operate in an antenna switch diversity mode for a transmission according to an antenna switching pattern. The antenna switching pattern may include UE 400 switching, during the transmission, between the first transmit chain coupled to the first antenna 420 and the second transmit chain coupled to the second antenna 425. That is, UE 400 implementing the antenna switch diversity mode may transmit a first portion of the signal using the first transmit chain coupled to the first antenna 420 and, then, transmit a second portion of the signal using the second transmit chain coupled to the second antenna 425. In some aspects, the second transmit chain may be deactivated, disabled, etc., while the first transmit chain coupled to the first antenna 420 is enabled to transmit the first portion of the signal. Similarly, the first transmit chain may be deactivated, disabled, etc., while the second transmit chain coupled to the second antenna 425 is enabled to transmit the second portion of the signal.

In some aspects, the antenna switching pattern of the antenna switch mode may be implemented according to the timing schedule. For example, the first transmit chain coupled to the first antenna 420 may be activated, enabled, etc., during a first time period for transmission of the first portion of the signal. Similarly, the second transmit chain coupled to the second antenna 425 may be activated, enabled, etc., during a second time period for transmission of the second portion of the signal. The first transmit chain coupled to the first antenna 420 may be deactivated, disabled, etc., during the second time period and the second transmit chain coupled to the second antenna 425 may be deactivated, disabled, etc., during the first time period.

Although UE 400 is shown as including two transmit chains coupled to respective antennas, it is to be understood that the UE may have more than two transmit chains coupled to respective antennas. For example, a UE having a third transmit chain coupled to a third antenna may be integrated into the antenna switching pattern of the antenna switch diversity mode. Therefore, the UE may transmit a third portion of the signal using a third transmit chain coupled to a third antenna. The third transmit chain coupled to the third antenna may be activated, enabled, etc., during a third time period (e.g., during transmission of the third portion of the uplink signal) and then deactivated, disabled, etc., during the first and second time periods.

The UE 400 without the antenna switch 460 may also operate the CDD mode. The UE 400 may transmit, according to the CDD mode, a first portion of the signal using the first transmit chain coupled to the first antenna 420 concurrently with transmitting a second portion of the signal using the second transmit chain coupled to the second antenna 425 with cyclic delay (different phase delay) between the first and second portions of the signal. This operation is similar to the operation described above when the UE 400 includes the antenna switch 460. Here, the first transmit chain is directly coupled to the first antenna 420 and the second transmit chain is directly coupled to the second antenna 425 without the need for the antenna switch 460 to couple the transmit chains accordingly.

Therefore, the UE 400 may support operations in the antenna switch diversity mode and the CDD mode with or without the antenna switch 460. In various aspects of the disclosure, the UE 400 may select between the antenna switch diversity mode and the CDD mode based on one or more parameters. Examples of factors may include, but are not limited to, channel estimation parameters associated with a wireless channel over which the UE 400 communicates and/or communication parameters associated with communications over the wireless channel. Channel estimation parameters may include, for example, a Doppler spread, a delay spread, an antenna correlation between the antennas 420 and 426 (e.g., transmit and/or receive antennas), an antenna imbalance between the antennas 420 and 425 (e.g., transmit and/or receive antennas), and/or other suitable channel estimation parameters. Communication parameters may include, for example, the MCS utilized by the UE 400 to transmit a signal, the resource block (RB) allocation size (e.g., the number of allocated RBs) utilized by the UE 400 for a transmission, a number of control channels (CCHs) (e.g., PDCCH and/or PSCCH) received by the UE 400, and/or other suitable communication parameters.

As used herein, the term Doppler spread refers to a measure of the spectral broadening due to the time rate of change of the wireless channel. As used herein, the term delay spread refers to a measure of the multipath richness of the wireless channel. In some examples, the delay spread may be the root-mean-square (rms) value of the delay of multipath reflections (reflected waves), weighted proportional to the energy in the reflected waves. As used herein, the term antenna correlation refers to a measure of a correlation between signals received by each of the antennas 420 and 425. The antenna correlation may be dependent upon, for example, the installation of each of the antennas 420 and 425. For example, the antenna correlation may be higher when the distance between the antennas 420 and 425 is shorter. As used herein, the term antenna imbalance refers to a difference in antenna gain between the antennas 420 and 425. The antenna gain difference may be dependent upon, for example, the type of each antenna 420 and 425, installation of each antenna 420 and 425, cable loss between the power amplifier (PA) and the antenna, and/or the respective angles between each of the UEs antennas 420 and 425 and each of the antennas on another UE with which the UE 400 is communicating (e.g., based on the antenna radiation patterns).

In some examples, the UE 400 may apply a respective weight to each of the parameters to produce weighted parameters and may select between antenna switch diversity mode and CDD mode based on the weighted parameters. In some examples, each of the parameters may be monitored over a time window (e.g., a duration of time), and the UE 400 may use an average or other combination of the respective values obtained for each parameter over the time window to select between antenna switch diversity mode and CDD mode. In some examples, the time window may correspond to a transmission periodicity (e.g., 100 msec) in V2X networks.

For example, the UE 400 may estimate the Doppler spread using a cross-correlation between DMRSs received in the time domain and combine the Doppler spread values obtained over the time window (e.g., calculate an average or median Doppler spread) to produce a combined Doppler spread. In another example, the Doppler spread may be estimated in the time domain from a time correlation averaged over the time window to produce a combined Doppler spread. It should be understood that the Doppler spread may be measured using any suitable technique. As another example, the UE 400 may estimate the delay spread using auto-correlation of a DMRS in the frequency domain and combine the delay spread values obtained over the time window (e.g., calculate an average or median delay spread) to produce a combined delay spread.

In some examples, the UE 400 may select between the antenna switch diversity mode and the CDD mode based on a combination of one or more of the parameters. For example, the UE 400 may select the CDD mode when the Tx antenna imbalance is high (e.g., above a threshold) and the MCS is high (e.g., above a threshold). As another example, the UE 400 may select the CDD mode when the Tx antenna imbalance is high and both the Doppler spread and delay spread are high (e.g., each above a threshold). As yet another example, the UE 400 may select either the CDD mode or the antenna switch diversity mode when the Tx antenna imbalance is low (e.g., below the threshold) and both the MCS and RB allocation size are high (e.g., above a threshold) or both the Tx antenna imbalance and the MCS are low (e.g., below respective thresholds) and the Doppler spread and delay spread are high (e.g., above respective thresholds). Other suitable parameter combinations and configurations (e.g., thresholds) may also be utilized by the UE 400 to select between the CDD mode and the antenna switch diversity mode.

In some examples, the UE 400 may select the CDD mode when the Tx antenna imbalance is high (e.g., above a threshold), the Rx antenna imbalance or antenna correlation is low (e.g., below a threshold), the Doppler spread is high, the delay spread is high (e.g., above a threshold), the MCS is high (e.g., above a threshold), and/or the RB allocation size is within a middle range. Otherwise, the UE 400 may select the antenna switch diversity mode.

In an example implementation, the UE 400 may select between the antenna switch diversity mode and the CDD mode based on the estimated Doppler spread. For example, the UE 400 may measure a respective Doppler spread value for each CCH received within the time window. When a first number of CCHs received during the time window exceeds a first threshold, the UE 400 may select the antenna switch diversity mode. In addition, when a ratio of a second number of Doppler spread values exceeding a second threshold during the time window to the first number of CCHs received during the time window exceeds a third threshold, the UE 400 may select the antenna switch diversity mode. Otherwise, the UE 400 may select the CDD mode.

In another example implementation, the UE 400 may select between the antenna switch diversity mode and the CDD mode based on the MCS. For example, the UE 400 may determine the MCS of a signal transmitted by the UE 400. When the MCS is less than a fourth threshold, the UE 400 may select the antenna switch diversity mode. Otherwise, the UE 400 may select the CDD mode.

In yet another example implementation, the UE 400 may select between the antenna switch diversity mode and the CDD mode based on the allocated RB size. For example, the UE 400 may determine the allocated RB size of a signal transmitted by the UE 400. When the allocated RB size is less than a fifth threshold, the UE 400 may select the antenna switch diversity mode. Otherwise, the UE 400 may select the CDD mode.

In another example implementation, the UE 400 may select between the antenna switch diversity mode and the CDD mode based on the antenna imbalance between the antennas 420 and 425. For example, the UE may determine an average Tx antenna imbalance over the time window. When the average Tx antenna imbalance is less than a sixth threshold, the UE 400 may select the antenna switch diversity mode. Otherwise, the UE 400 may select the CDD mode.

Figure 5:
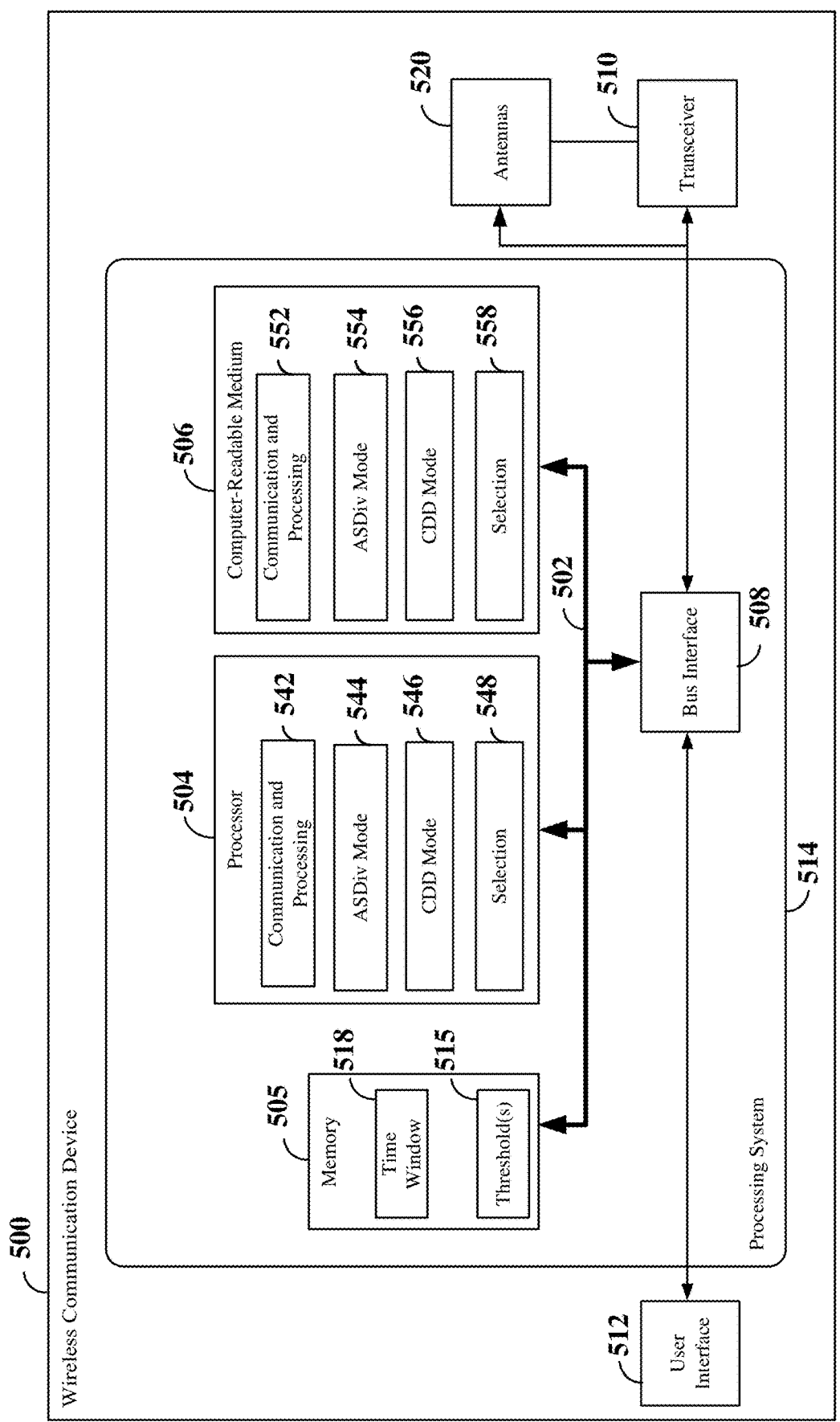
FIG. 5 is a block diagram illustrating an example of a hardware implementation for a wireless communication device employing a processing system according to some aspects.

FIG. 5 is a block diagram illustrating an example of a hardware implementation for a wireless communication device (e.g., UE) 500 employing a processing system 514. For example, the wireless communication device 500 may correspond to any of the UEs, sidelink devices (e.g., D2D devices or V2X devices) and/or other suitable wireless communication devices shown in FIGS. 1, 2, and/or 4.

The wireless communication device 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 500 may be configured to perform any one or more of the functions described herein. That is, the processor 504, as utilized in the wireless communication device 500, may be used to implement any one or more of the processes and procedures described below.

The processor 504 may in some instances be implemented via a baseband or modem chip and in other implementations, the processor 504 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 514 may be implemented with a bus architecture, represented generally by the bus 502. The bus 502 may include any number of interconnecting buses and bridges depending on the specific application of the processing system 514 and the overall design constraints. The bus 502 links together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further.

A bus interface 508 provides an interface between the bus 502, a transceiver 510, and a set of two or more antennas 520. In some examples, the transceiver 510 may correspond to the transceiver 410 shown in FIG. 4. The transceiver 510 provides a communication interface or a means for communicating with various other apparatus over a transmission medium (e.g., air interface) via the antennas 520. Depending upon the nature of the apparatus, a user interface 512 (e.g., keypad, display, touch screen, speaker, microphone, control knobs, etc.) may also be provided. Of course, such a user interface 512 is optional, and may be omitted in some examples.

The processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software. For example, the memory 505 may store one or more thresholds 515 and a time window 518 used by the processor 504.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506.

The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. In some examples, the computer-readable medium 506 may be part of the memory 505. Those skilled in the art will recognize how best to implement the described functionality presented throughout this disclosure depending on the particular application and the overall design constraints imposed on the overall system.

In some aspects of the disclosure, the processor 504 may include circuitry configured for various functions. For example, the processor 504 may include communication and processing circuitry 542, configured to communicate with one or more sidelink devices (e.g., other UEs) via respective sidelinks (e.g., PC5 interfaces). In addition, the communication and processing circuitry 542 may be configured to communicate with a base station (e.g., gNB or eNB) via a Uu link. In some examples, the communication and processing circuitry 542 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 542 may include one or more transmit/receive chains.

In some implementations where the communication involves receiving information, the communication and processing circuitry 542 may obtain information from a component of the wireless communication device 500 (e.g., from the transceiver 510 that receives the information via radio frequency signaling or some other type of signaling suitable for the applicable communication medium), process (e.g., decode) the information, and output the processed information. For example, the communication and processing circuitry 542 may output the information to another component of the processor 504, to the memory 505, or to the bus interface 508. In some examples, the communication and processing circuitry 542 may receive one or more of signals, messages, other information, or any combination thereof. In some examples, the communication and processing circuitry 542 may receive information via one or more channels. In some examples, the communication and processing circuitry 542 may include functionality for a means for receiving. In some examples, the communication and processing circuitry 542 may include functionality for a means for processing, including a means for demodulating, a means for decoding, etc.

In some implementations where the communication involves sending (e.g., transmitting) information, the communication and processing circuitry 542 may obtain information (e.g., from another component of the processor 504, the memory 505, or the bus interface 508), process (e.g., modulate, encode, etc.) the information, and output the processed information. For example, the communication and processing circuitry 542 may output the information to the transceiver 510 (e.g., that transmits the information via radio frequency signaling or some other type of signaling suitable for the applicable communication medium). In some examples, the communication and processing circuitry 542 may send one or more of signals, messages, other information, or any combination thereof. In some examples, the communication and processing circuitry 542 may send information via one or more channels. In some examples, the communication and processing circuitry 542 may include functionality for a means for sending (e.g., a means for transmitting). In some examples, the communication and processing circuitry 542 may include functionality for a means for generating, including a means for modulating, a means for encoding, etc.

In some examples, the communication and processing circuitry 542 may be configured to generate and transmit data traffic and control channels within one or more subframes, slots, and/or mini-slots in accordance with an MCS and allocated RB size (e.g., allocated by the wireless communication device 500, a base station, or other scheduling entity) for the data traffic and control channels. In addition, the communication and processing circuitry 542 may be configured to receive and process data traffic and control channels within one or more subframes, slots, and/or mini-slots. In some examples, the communication and processing circuitry 542 may include the modem 405 shown in FIG. 4.

In some examples, the communication and processing circuitry 542 may be configured to receive and process one or more control channels (CCHs), such as a PDCCH and/or PSCCH. Each CCH may be received via multiple antennas 520 (e.g., each of the two or more antennas 520). In some examples, the communication and processing circuitry 542 may be configured to generate two or more portions of a signal (e.g., a signal containing data and/or control information) for transmission via two or more of the antennas 520 in an antenna switch diversity mode or a CDD mode. The communication and processing circuitry 542 may further be configured to execute communication and processing software 552 stored on the computer-readable medium 506 to implement one or more functions described herein.

The processor 504 may further include antenna switch diversity (ASDiv) mode circuitry 544, configured to operate in an ASDiv mode to transmit a signal. In some examples, the ASDiv mode circuitry 544 may be configured to activate a first transmit chain (e.g., including a first portion of the communication and processing circuitry 542 and a first portion of the transceiver 510) for transmission of a first portion of the signal via a first antenna of the set of two or more antennas 520. The ASDiv mode circuitry 544 may then switch from the first antenna to a second antenna of the set of two or more antennas 520 to transmit a second portion of the signal via the first transmit chain. The ASDiv mode circuitry 544 may repeat the antenna switching pattern (e.g., the first transmit chain is switched between the first antenna and the second antenna) one or more times during the signal transmission. In this example, the ASDiv mode circuitry 544 may be configured to deactivate, disable, or otherwise turn off other transmit chains (e.g., other portions of the communication and processing circuitry 542 and transceiver 510) during transmission of the signal.

In other examples, the ASDiv mode circuitry 544 may be configured to activate the first transmit chain for transmission of the first portion of the signal via the first antenna. The ASDiv mode circuitry 544 may then be configured to activate a second transmit chain (e.g., including a second portion of the communication and processing circuitry 542 and a second portion of the transceiver 510) for transmission of a second portion of the signal via a second antenna of the set of two or more antennas 520. The ASDiv mode circuitry 544 may repeat the antenna switching pattern (e.g., the different portions of the signal are switched between the first transmit chain/first antenna and second transmit chain/second antenna) one or more times during the signal transmission. In this example, the ASDiv mode circuitry 544 may be configured to deactivate, disable, or otherwise turn off the first transmit chain (while the second transmit chain is transmitting the second portion of the signal) and/or the second transmit chain (while the first transmit chain is transmitting the first portion of the signal). The ASDiv mode circuitry 544 may further be configured to execute ASDiv mode software 554 stored on the computer-readable medium 506 to implement one or more functions described herein.

The processor 504 may further include CDD mode circuitry 546, configured to operate in a CDD mode to transmit a signal. In some examples, the CDD mode circuitry 546 may be configured to activate the first transmit chain that is coupled to the first antenna and the second transmit chain that is coupled to the second antenna concurrently for transmission of respective portions of the signal simultaneously with cyclic delay (different phase delay) between the signal portions. The CDD mode circuitry 546 may further be configured to execute CDD mode software 556 stored on the computer-readable medium 506 to implement one or more functions described herein.

The processor 504 may further include selection circuitry 548, configured to select a transmission mode for transmission of a signal (e.g., an uplink signal to a base station or a sidelink signal to one or more other wireless communication devices). The transmission mode may be one of the antenna switch diversity mode and the CDD mode. In some examples, the selection circuitry 548 may select between the ASDiv mode circuitry 544 and the CDD mode circuitry 546 for transmission of the signal based on a combination of one or more channel estimation parameters (e.g., the Doppler spread, the antenna imbalance between the antennas 520, the antenna correlation between the antennas 520, and/or the delay spread) and/or one or more communication parameters (e.g., the number of CCHs received by the communication and processing circuitry 542, the MCS and/or the allocated RB size), and/or other suitable parameters.

In some examples, the selection circuitry 548 may be configured to determine an average (or median) value of at least one of the parameters associated with a set of signals communicated over a time window. For example, the signals may include DMRSs, CCHs, PUSCHs, PSSCHs, or other suitable signals. The selection circuitry 548 may then select between the antenna switch diversity mode and the CDD mode based on the average parameter values. In some examples, the selection circuitry 548 may be configured to apply a respective weight to a set of two or more parameters utilized in the selection to produce weighted parameters. The selection circuitry 548 may then select between the antenna switch diversity mode and the CDD mode based on the weighted parameters.

In some examples, the selection circuitry 548 may be configured to select the CDD mode when the Tx antenna imbalance is high (e.g., above a threshold 515), the Rx antenna imbalance or antenna correlation is low (e.g., below a threshold 515), the Doppler spread is high (e.g., above a threshold 515), the delay spread is high (e.g., above a threshold 515), the MCS is high (e.g., above a threshold 515), and/or the RB allocation size is within a middle range (e.g., within a range set by two thresholds 515). Here, each threshold 515 may be one of a plurality of thresholds 515 stored, for example, in memory 505. Otherwise, the selection circuitry 548 may be configured to select the antenna switch diversity mode.

In one example, the selection circuitry 548 may be configured to select between the antenna switch diversity mode and the CDD mode based on the Doppler spread. For example, the selection circuitry 548 may measure a respective Doppler spread value between the antennas 520 for each CCH received by the communication and processing circuitry 542 within a time window 518. The time window 518 may correspond to a duration of time that may be preconfigured on the wireless communication device 500 and stored, for example, in memory 505. The selection circuitry 548 may be configured to select the ASDiv mode circuitry 544 for transmission of a signal when a first number of CCHs received during the time window 518 exceeds a first threshold 515. Here, the first threshold 515 may be one of the plurality of thresholds 515 stored, for example, in memory 505. In addition, the selection circuitry 548 may be configured to determine a second number of Doppler spread values exceeding a second threshold 515 during the time window 518 to obtain a ratio of the second number of Doppler spread values that exceed the second threshold to the first number of CCHs. The selection circuitry 548 may then be configured to select the ASDiv mode circuitry 544 for transmission of the signal when the ratio exceeds a third threshold 515. Otherwise, the selection circuitry 548 may be configured to select the CDD mode circuitry 546 for transmission of the signal.

In another example, the selection circuitry 548 may be configured to select between the antenna switch diversity mode and the CDD mode based on the MCS. For example, the selection circuitry 548 may be configured to determine the MCS of a signal transmitted by the communication and processing circuitry 542. The selection circuitry 548 may be configured to select the ASDiv mode circuitry 544 for transmission of the signal when the MCS is less than a fourth threshold 515. Otherwise, the selection circuitry 548 may be configured to select the CDD mode circuitry 546 for transmission of the signal.

In another example, the selection circuitry 548 may be configured to select between the antenna switch diversity mode and the CDD mode based on the allocated RB size. For example, the selection circuitry 548 may be configured to determine the allocated RB size of a signal transmitted by the communication and processing circuitry 542. The selection circuitry 548 may then be configured to select the ASDiv mode circuitry 544 for transmission of the signal when the allocated RB size is less than a fifth threshold 515. Otherwise, the selection circuitry 548 may be configured to select the CDD mode circuitry 546 for transmission of the signal.

In another example, the selection circuitry 548 may be configured to select between the antenna switch diversity mode and the CDD mode based on the antenna imbalance between the antennas 520. The antenna imbalance may correspond, for example, to a difference in antenna gain between the antennas 520. The selection circuitry 548 may be configured to select the ASDiv mode circuitry 544 for transmission of the signal when the antenna imbalance is less than a sixth threshold 515. Otherwise, the selection circuitry 548 may select the CDD mode circuitry 546 for transmission of the signal. The selection circuitry 548 may further be configured to execute selection software 558 stored on the computer-readable medium 506 to implement one or more functions described herein.

Figure 6:
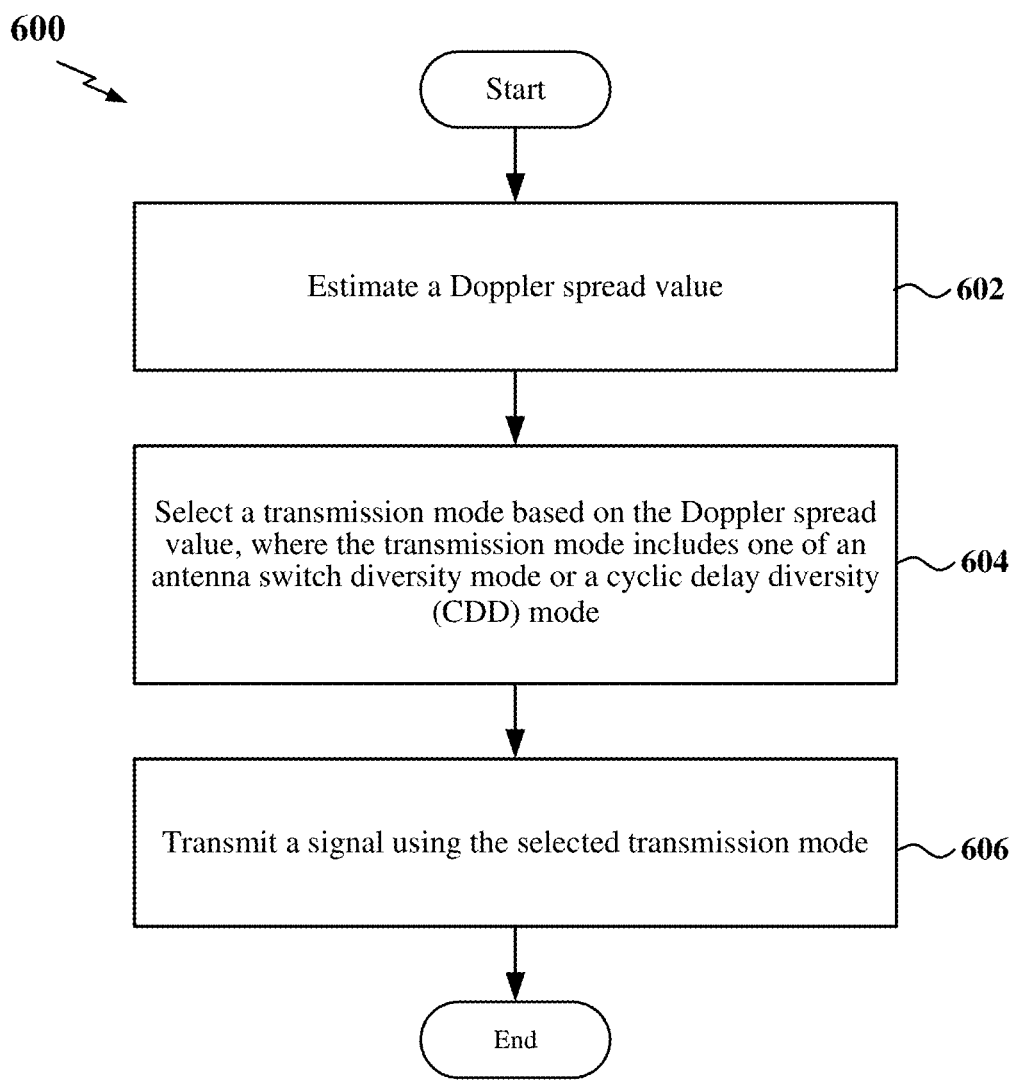
FIG. 6 is a flow chart of an exemplary method for a wireless communication device to select a transmission mode corresponding to an antenna switch diversity mode or CDD mode according to some aspects.

FIG. 6 is a flow chart 600 of a method of an example implementation for a wireless communication device to select a transmission mode corresponding to an antenna switch diversity mode or CDD mode according to some aspects. As described below, some or all illustrated features may be omitted in a particular implementation within the scope of the present disclosure, and some illustrated features may not be required for implementation of all embodiments. In some examples, the method may be performed by the wireless communication device 500, as described above and illustrated in FIG. 5, by a processor or processing system, or by any suitable means for carrying out the described functions.

At block 602, the wireless communication device may estimate a Doppler spread of the wireless communication device. For example, the wireless communication device may measure a set of Doppler spread values over a time window. In some examples, the wireless communication device may measure a respective Doppler spread value for each control channel received within the time window. The wireless communication device may then determine a total number of Doppler spread values within the set of Doppler spread values and a first number of Doppler spread values within the set of Doppler spread values that are greater than a first threshold. For example, the selection circuitry 548, shown and described above in connection with FIG. 5, may provide a means to estimate the Doppler spread.

At block 604, the wireless communication device may select a transmission mode based on the Doppler spread. The transmission mode includes one of an antenna switch diversity mode or a cyclic delay diversity (CDD) mode. In some examples, the wireless communication device may select the antenna switch diversity mode when the total number of Doppler spread values is less than a second threshold and the CDD mode when the total number of Doppler spread values is greater than or equal to the second threshold. In some examples, the wireless communication device may select the antenna switch diversity mode when a ratio between the first number of Doppler spread values and the total number of Doppler spread values is greater than a third threshold and the CDD mode when the ratio is less than or equal to the third threshold. For example, the selection circuitry 548, shown and described above in connection with FIG. 5 may provide a means to select the transmission mode.

At block 606, the wireless communication device may transmit a signal using the selected transmission mode. In some examples, the wireless communication device may transmit the signal on a sidelink to another wireless communication device. For example, the wireless communication device may be a V2X device in a V2X network. For example, the ASDiv mode circuitry 544 or CDD mode circuitry 546, together with the communication and processing circuitry 542, transceiver 510, and antennas 520, shown and described above in connection with FIG. 5 may provide a means to transmit the signal using the ASDiv mode or the CDD mode.

Figure 7:
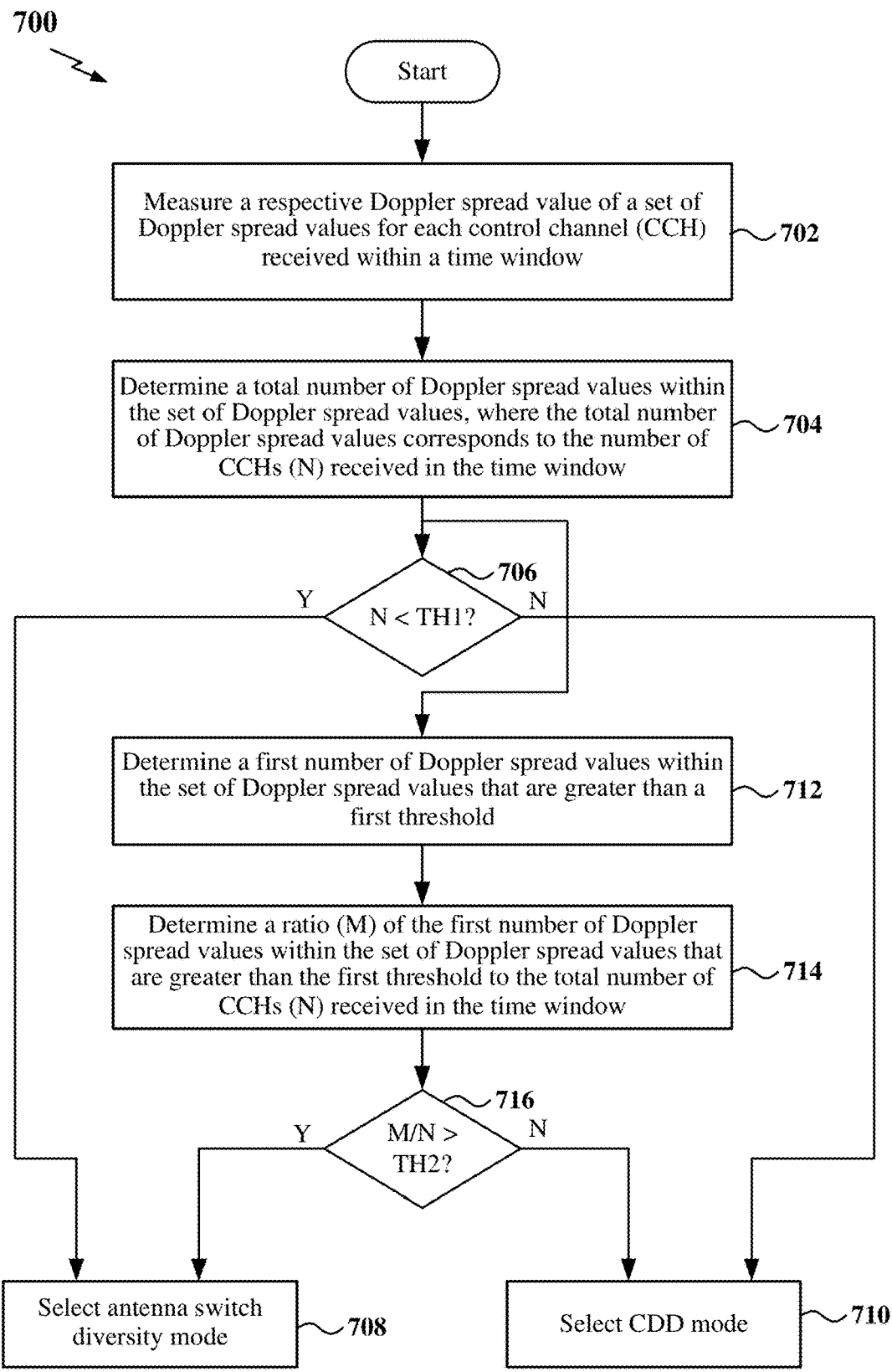
FIG. 7 is a flow chart of another exemplary method for a wireless communication device to select a transmission mode corresponding to an antenna switch diversity mode or CDD mode according to some aspects.

FIG. 7 is a flow chart 700 of another method of an example implementation for a wireless communication device to select a transmission mode corresponding to an antenna switch diversity mode or CDD mode according to some aspects. As described below, some or all illustrated features may be omitted in a particular implementation within the scope of the present disclosure, and some illustrated features may not be required for implementation of all embodiments. In some examples, the method may be performed by the wireless communication device 500, as described above and illustrated in FIG. 5, by a processor or processing system, or by any suitable means for carrying out the described functions.

At block 702, the wireless communication device may measure a respective Doppler spread value of the wireless communication device for each control channel (CCH) received within a time window to produce a set of Doppler spread values. For example, the selection circuitry 548, shown and described above in connection with FIG. 5, may provide a means to measure the set of Doppler spread values.

At block 704, the wireless communication device may determine a total number of Doppler spread values within the set of Doppler spread values. Here, the total number of Doppler spread values corresponds to the number of CCHs (N) received in the time window. For example, the selection circuitry 548, shown and described above in connection with FIG. 5, may provide a means to determine the total number of CCHs (N).

At block 706, the wireless communication device may optionally determine whether the total number of CCHs (N) is greater than a first threshold (e.g., N>TH1). When the total number of CCHs (N) is greater than TH1 (Y branch of block 706), at block 708, the wireless communication device may select an antenna switch diversity mode for transmission of a signal. When the total number of CCHs (N) is less than TH1 (N branch of block 706), at block 710, the wireless communication device may select a CDD mode for transmission of the signal. For example, the selection circuitry 548, shown and described above in connection with FIG. 5, may provide a means to select either the antenna switch diversity mode or the CDD mode based on the number of CCHs (N) received during the time window.

In examples in which block 706 is bypassed (e.g., the selection of the transmission mode is not based solely on N), the method proceeds to block 712, where the wireless communication device may determine a first number of Doppler spread values (M) within the set of Doppler spread values that are greater than a second threshold (TH2). At block 714, the wireless communication device may then determine a ratio of the first number of Doppler spread values (M) within the set of Doppler spread values that are greater than the second threshold (TH2) to the total number of CCHs (N) received in the time window. For example, the selection circuitry 548, shown and described above in connection with FIG. 5 may provide a means to determine M and the ratio of M/N.

At block 716, the wireless communication device may determine whether the ratio (M/N) is greater than a third threshold (TH3). When the ratio (M/N) is greater than TH3 (Y branch of block 716), at block 708, the wireless communication device may select an antenna switch diversity mode for transmission of a signal. When the ratio (M/N) is less than TH3 (N branch of block 716), at block 710, the wireless communication device may select a CDD mode for transmission of the signal. For example, the selection circuitry 548, shown and described above in connection with FIG. 5, may provide a means to select either the antenna switch diversity mode or the CDD mode based on the ratio M/N.

Figure 8:
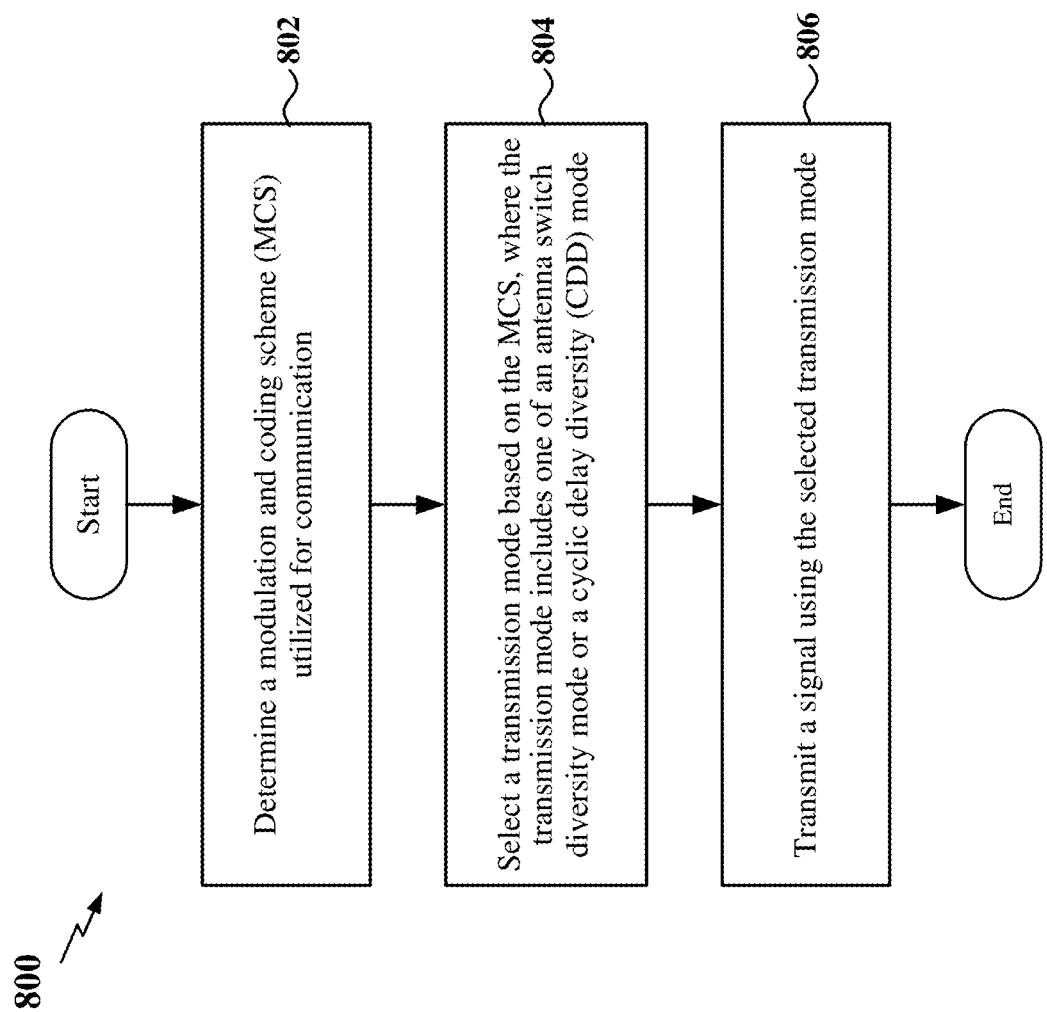
FIG. 8 is a flow chart of another exemplary method for a wireless communication device to select a transmission mode corresponding to an antenna switch diversity mode or CDD mode according to some aspects.

FIG. 8 is a flow chart 800 of another method of an example implementation for a wireless communication device to select a transmission mode corresponding to an antenna switch diversity mode or CDD mode according to some aspects. As described below, some or all illustrated features may be omitted in a particular implementation within the scope of the present disclosure, and some illustrated features may not be required for implementation of all embodiments. In some examples, the method may be performed by the wireless communication device 500, as described above and illustrated in FIG. 5, by a processor or processing system, or by any suitable means for carrying out the described functions.

At block 802, the wireless communication device may determine a modulation and coding scheme (MCS) utilized for communication (e.g., a PUSCH or PSSCH) by the wireless communication device. For example, the selection circuitry 548, shown and described above in connection with FIG. 5, may provide a means to determine the MCS.

At block 804, the wireless communication device may select a transmission mode based on the MCS. The transmission mode includes one of an antenna switch diversity mode or a cyclic delay diversity (CDD) mode. In some examples, the wireless communication device may select the antenna switch diversity mode when the MCS is less than a threshold and the CDD mode when the MCS is greater than or equal to the threshold. For example, the selection circuitry 548, shown and described above in connection with FIG. 5 may provide a means to select the transmission mode.

At block 806, the wireless communication device may transmit a signal using the selected transmission mode. In some examples, the wireless communication device may transmit the signal on a sidelink to another wireless communication device. For example, the wireless communication device may be a V2X device in a V2X network. For example, the ASDiv mode circuitry 544 or CDD mode circuitry 546, together with the communication and processing circuitry 542, transceiver 510, and antennas 520, shown and described above in connection with FIG. 5 may provide a means to transmit the signal using the ASDiv mode or the CDD mode.

Figure 9:
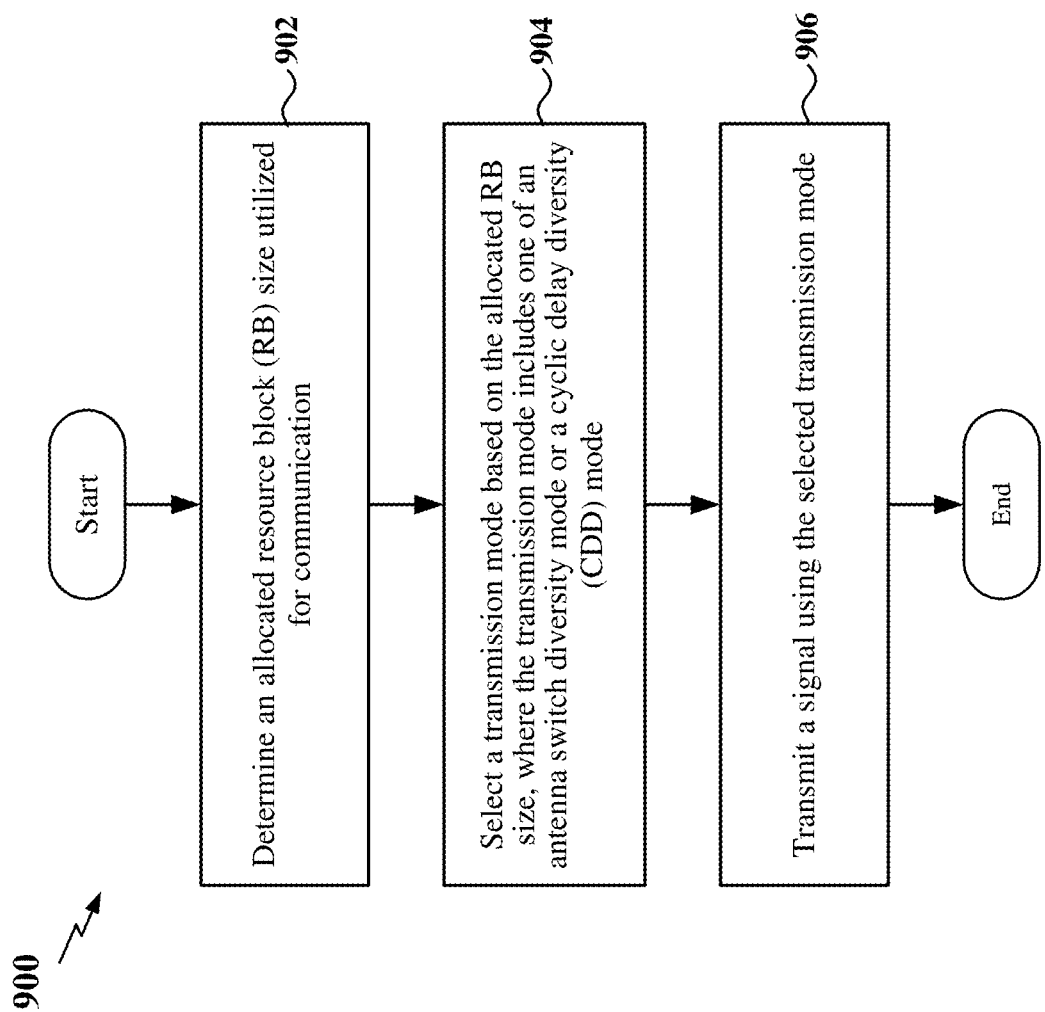
FIG. 9 is a flow chart of another exemplary method for a wireless communication device to select a transmission mode corresponding to an antenna switch diversity mode or CDD mode according to some aspects.

FIG. 9 is a flow chart 900 of another method of an example implementation for a wireless communication device to select a transmission mode corresponding to an antenna switch diversity mode or CDD mode according to some aspects. As described below, some or all illustrated features may be omitted in a particular implementation within the scope of the present disclosure, and some illustrated features may not be required for implementation of all embodiments. In some examples, the method may be performed by the wireless communication device 500, as described above and illustrated in FIG. 5, by a processor or processing system, or by any suitable means for carrying out the described functions.

At block 902, the wireless communication device may determine an allocated resource block (RB) size utilized for communication (e.g., a PUSCH or PSSCH) by the wireless communication device. For example, the selection circuitry 548, shown and described above in connection with FIG. 5, may provide a means to determine the allocated RB size.

At block 904, the wireless communication device may select a transmission mode based on the allocated RB size. The transmission mode includes one of an antenna switch diversity mode or a cyclic delay diversity (CDD) mode. In some examples, the wireless communication device may select the antenna switch diversity mode when the RB size is less than a threshold and the CDD mode when the RB size is greater than or equal to the threshold. For example, the selection circuitry 548, shown and described above in connection with FIG. 5 may provide a means to select the transmission mode.

At block 906, the wireless communication device may transmit a signal using the selected transmission mode. In some examples, the wireless communication device may transmit the signal on a sidelink to another wireless communication device. For example, the wireless communication device may be a V2X device in a V2X network. For example, the ASDiv mode circuitry 544 or CDD mode circuitry 546, together with the communication and processing circuitry 542, transceiver 510, and antennas 520, shown and described above in connection with FIG. 5 may provide a means to transmit the signal using the ASDiv mode or the CDD mode.

Figure 10:
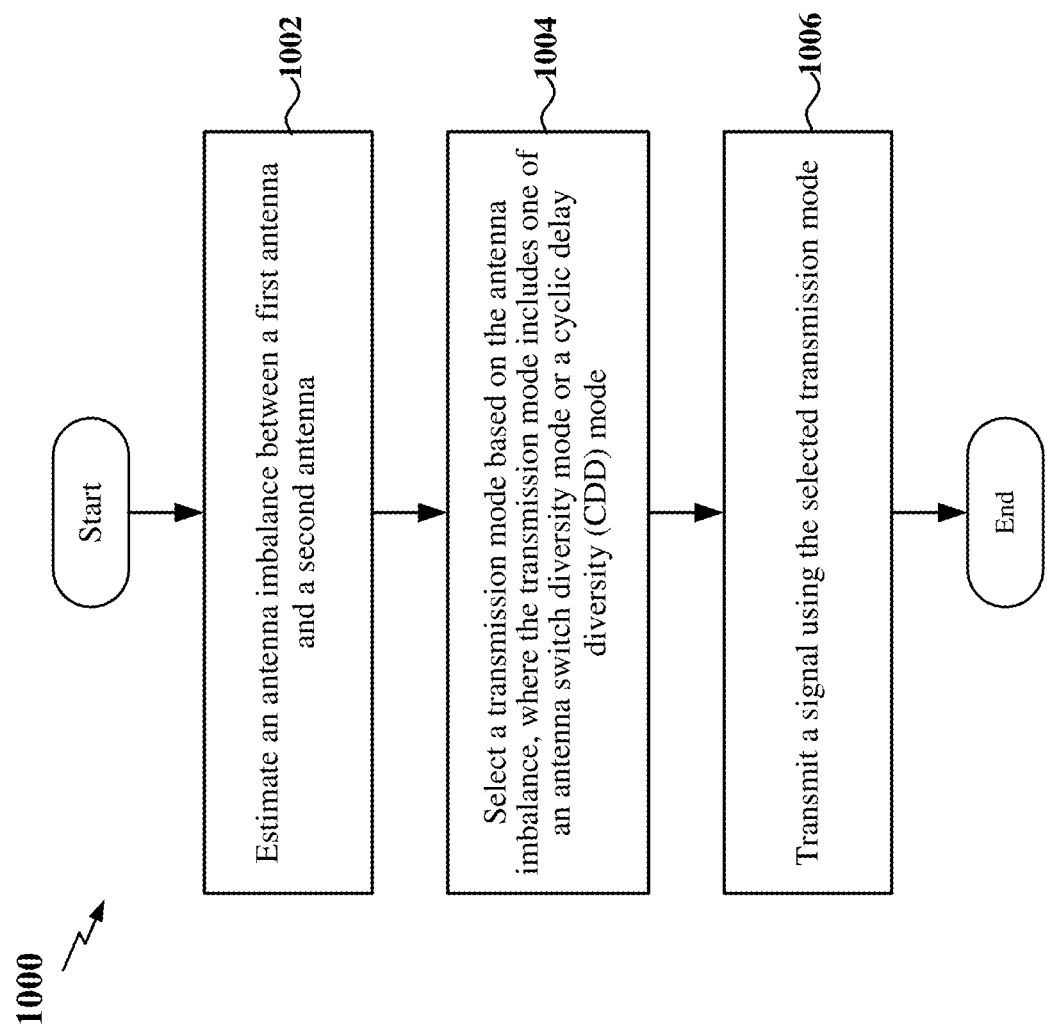
FIG. 10 is a flow chart of another exemplary method for a wireless communication device to select a transmission mode corresponding to an antenna switch diversity mode or CDD mode according to some aspects.

FIG. 10 is a flow chart 1000 of another method of an example implementation for a wireless communication device to select a transmission mode corresponding to an antenna switch diversity mode or CDD mode according to some aspects. As described below, some or all illustrated features may be omitted in a particular implementation within the scope of the present disclosure, and some illustrated features may not be required for implementation of all embodiments. In some examples, the method may be performed by the wireless communication device 500, as described above and illustrated in FIG. 5, by a processor or processing system, or by any suitable means for carrying out the described functions.

At block 1002, the wireless communication device may estimate an antenna imbalance between a first antenna and a second antenna of the wireless communication device. In some examples, the antenna imbalance may be a static value corresponding to an antenna gain difference between the first and second antennas. For example, the selection circuitry 548, shown and described above in connection with FIG. 5, may provide a means to determine the antenna imbalance.

At block 1004, the wireless communication device may select a transmission mode based on the antenna imbalance. The transmission mode includes one of an antenna switch diversity mode or a cyclic delay diversity (CDD) mode. In some examples, the wireless communication device may select the antenna switch diversity mode when the antenna imbalance is less than a threshold and the CDD mode when the antenna imbalance is greater than or equal to the threshold. For example, the selection circuitry 548, shown and described above in connection with FIG. 5 may provide a means to select the transmission mode.

At block 1006, the wireless communication device may transmit a signal using the selected transmission mode. In some examples, the wireless communication device may transmit the signal on a sidelink to another wireless communication device. For example, the wireless communication device may be a V2X device in a V2X network. For example, the ASDiv mode circuitry 544 or CDD mode circuitry 546, together with the communication and processing circuitry 542, transceiver 510, and antennas 520, shown and described above in connection with FIG. 5 may provide a means to transmit the signal using the ASDiv mode or the CDD mode.

Figure 11:
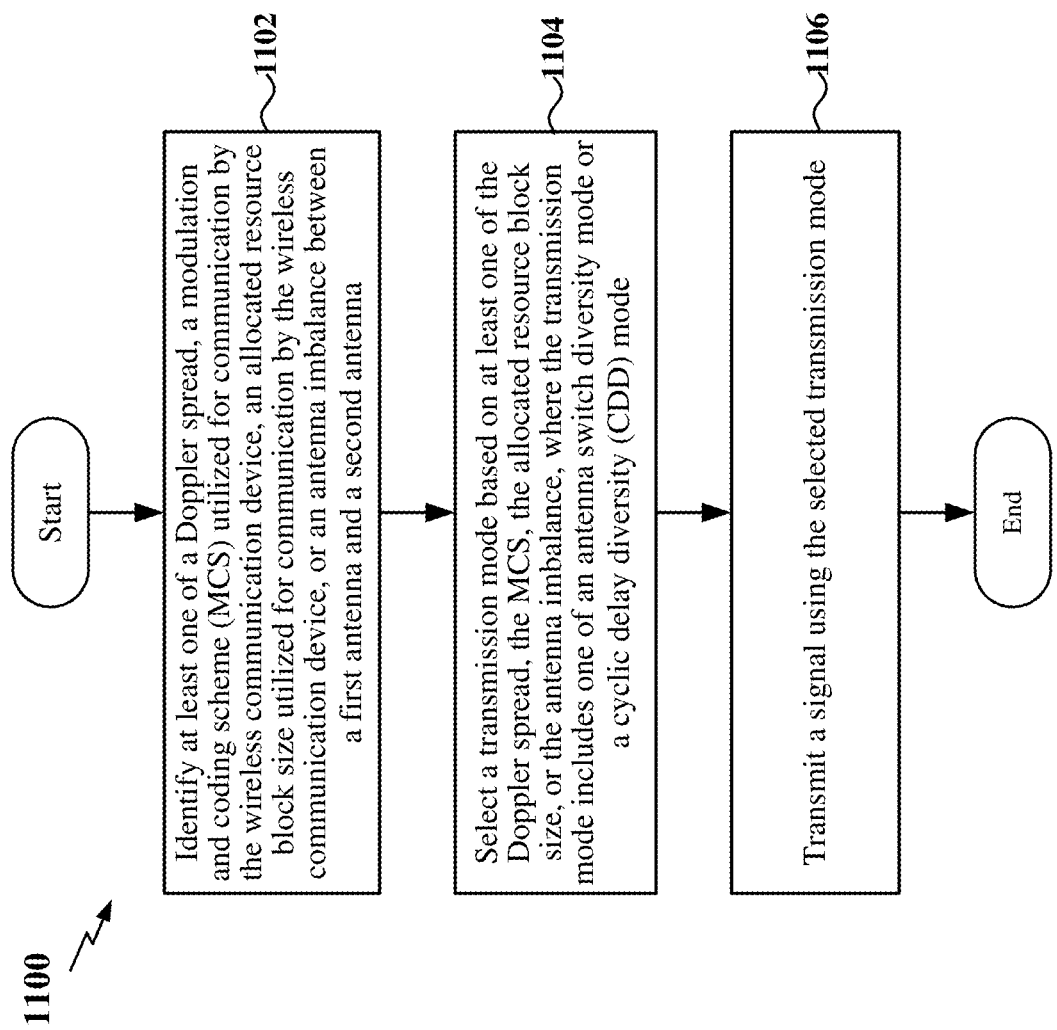
FIG. 11 is a flow chart of another exemplary method for a wireless communication device to select a transmission mode corresponding to an antenna switch diversity mode or CDD mode according to some aspects.

FIG. 11 is a flow chart 1100 of a method for a wireless communication device to select a transmission mode corresponding to an antenna switch diversity mode or CDD mode, which may include one or more of the example implementations described above in connection with FIGS. 6-10 according to some aspects. As described below, some or all illustrated features may be omitted in a particular implementation within the scope of the present disclosure, and some illustrated features may not be required for implementation of all embodiments. In some examples, the method may be performed by the wireless communication device 500, as described above and illustrated in FIG. 5, by a processor or processing system, or by any suitable means for carrying out the described functions.

At block 1102, the wireless communication device may identify at least one of a Doppler spread, a modulation and coding scheme (MCS) utilized for communication by the wireless communication device, an allocated resource block size utilized for communication by the wireless communication device, or an antenna imbalance between a first antenna and a second antenna. In some examples, the wireless communication device may measure a set of Doppler spread values over a time window. For example, the wireless communication device may measure a respective Doppler spread value of the set of Doppler spread values for each control channel received within the time window. For example, the selection circuitry 548, shown and described above in connection with FIG. 5, may provide a means to identify at least one of the Doppler spread, MCS, allocated resource block size, or antenna imbalance.

At block 1104, the wireless communication device may select a transmission mode based on at least one of the Doppler spread, the MCS, the allocated resource block size, or the antenna imbalance. The transmission mode may include one of an antenna switch diversity mode or a cyclic delay diversity (CDD) mode. In some examples, the wireless communication device may select the antenna switch diversity mode based on the MCS being less than a threshold and select the CDD mode based on the MCS being greater than or equal to the threshold. In some examples, the wireless communication device may select the antenna switch diversity mode based on the allocated resource block size being less than a threshold and select the CDD mode based on the average allocated resource block size being greater than or equal to the threshold. In some examples, the wireless communication device may select the antenna switch diversity mode based on the antenna imbalance being less than a threshold and select the CDD mode based on the antenna imbalance being greater than or equal to the threshold. For example, the selection circuitry 548, shown and described above in connection with FIG. 5 may provide a means to select the transmission mode.

At block 1106, the wireless communication device may transmit a signal using the selected transmission mode. In some examples, the wireless communication device may transmit the signal on a sidelink to another wireless communication device. For example, the wireless communication device may be a V2X device in a V2X network. For example, the ASDiv mode circuitry 544 or CDD mode circuitry 546, together with the communication and processing circuitry 542, transceiver 510, and antennas 520, shown and described above in connection with FIG. 5 may provide a means to transmit the signal using the ASDiv mode or the CDD mode.

Figure 12:
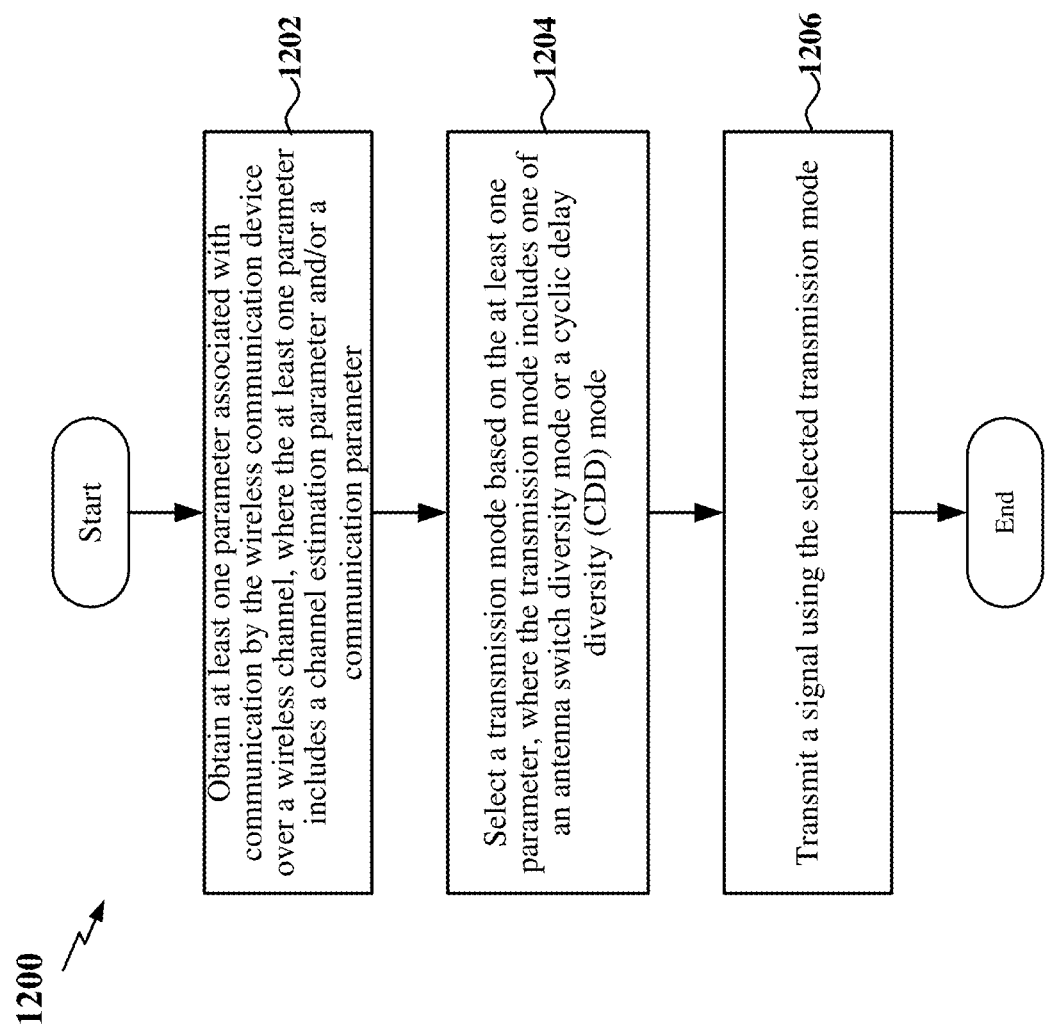
FIG. 12 is a flow chart of another exemplary method for a wireless communication device to select a transmission mode corresponding to an antenna switch diversity mode or CDD mode according to some aspects.

FIG. 12 is a flow chart 1200 of a method for a wireless communication device to select a transmission mode corresponding to an antenna switch diversity mode or CDD mode, which may include one or more of the example implementations described above in connection with FIGS. 6-11 according to some aspects. As described below, some or all illustrated features may be omitted in a particular implementation within the scope of the present disclosure, and some illustrated features may not be required for implementation of all embodiments. In some examples, the method may be performed by the wireless communication device 500, as described above and illustrated in FIG. 5, by a processor or processing system, or by any suitable means for carrying out the described functions.

At block 1202, the wireless communication device may obtain at least one parameter associated with communication by the wireless communication device over a wireless channel. The at least one parameter includes a channel estimation parameter associated with the wireless channel and/or a communication parameter associated with at least one communication on the wireless channel. Channel estimation parameters may include, for example, a Doppler spread, a delay spread, an antenna correlation between antennas (e.g., transmit and/or receive antennas) of the wireless communication device, and/or an antenna imbalance between the antennas (e.g., transmit and/or receive antennas). Communication parameters may include, for example, the MCS utilized by the wireless communication device to transmit one or more signals, the resource block (RB) allocation size (e.g., the number of allocated RBs) utilized by the wireless communication device for one or more transmissions, and/or a number of control channels (CCHs) (e.g., PDCCH and/or PSCCH) received by the wireless communication device. For example, the selection circuitry 548, shown and described above in connection with FIG. 5, may provide a means to obtain the at least one parameter.

At block 1204, the wireless communication device may select a transmission mode based on the at least one parameter. The transmission mode includes one of an antenna switch diversity mode or a cyclic delay diversity (CDD) mode. In some examples, the wireless communication device may determine a respective combined value (e.g., an average value) for the at least one parameter associated with a set of signals communicated over a time window to produce at least one combined parameter and select the transmission mode based on the at least one combined parameter. In some examples, the wireless communication device may apply a respective weight to the at least one parameter to produce at least one weighted parameter and select the transmission mode based on the at least one weighted parameter. In some examples, the at least one parameter includes a plurality of parameters, each corresponding to a different channel estimation parameter or a different communication parameter. The wireless communication device may select the transmission based on a combination of the plurality of parameters.

In some examples, the antenna switch diversity mode may be selected based on the antenna imbalance being less than a first threshold, the antenna correlation being greater than or equal to a second threshold, the Doppler spread being less than a third threshold, or the delay spread being less than a fourth threshold. In some examples, the CDD mode may be selected based on the antenna imbalance being greater than or equal to the first threshold, the antenna correlation being less than the second threshold, the Doppler spread being greater than or equal to a third threshold, or the delay spread being greater than or equal to a fourth threshold.

In some examples, the antenna switch diversity mode may be selected based on the MCS being less than a threshold, and the CDD mode may be selected based on the MCS being greater than or equal to the threshold. In some examples, the antenna switch diversity mode may be selected based on the allocated resource block size being less than a threshold, and the CDD mode may be selected based on the average allocated resource block size being greater than or equal to the threshold. For example, the selection circuitry 548, shown and described above in connection with FIG. 5 may provide a means to select the transmission mode.

At block 1206, the wireless communication device may transmit a signal using the selected transmission mode. In some examples, the wireless communication device may transmit the signal on a sidelink to another wireless communication device. For example, the wireless communication device may be a V2X device in a V2X network. For example, the ASDiv mode circuitry 544 or CDD mode circuitry 546, together with the communication and processing circuitry 542, transceiver 510, and antennas 520, shown and described above in connection with FIG. 5 may provide a means to transmit the signal using the ASDiv mode or the CDD mode.

In one configuration, the wireless communication device 500 includes means for selecting a transmission mode as one of an antenna switch diversity mode or a CDD mode as described in the present disclosure. In one aspect, the aforementioned means may be the processor 504 shown in FIG. 5 configured to perform the functions recited by the aforementioned means. In another aspect, the aforementioned means may be a circuit or any apparatus configured to perform the functions recited by the aforementioned means.

Of course, in the above examples, the circuitry included in the processor 504 is merely provided as an example, and other means for carrying out the described functions may be included within various aspects of the present disclosure, including but not limited to the instructions stored in the computer-readable storage medium 506, or any other suitable apparatus or means described in any one of the FIGS. 1, 2, and/or 4, and utilizing, for example, the processes and/or algorithms described herein in relation to FIGS. 7-12.

The following provides an overview of examples of the present disclosure.

Example 1

A method of wireless communication at a wireless communication device, the method comprising: obtaining at least one parameter associated with communication by the wireless communication device over a wireless channel, wherein the at least one parameter comprises a channel estimation parameter associated with the wireless channel, a communication parameter associated with at least one communication on the wireless channel, or a combination thereof; selecting a transmission mode based on the at least one parameter, wherein the transmission mode comprises one of an antenna switch diversity mode or a cyclic delay diversity (CDD) mode; and transmitting a signal using the selected transmission mode.

Example 2

The method of example 1, wherein the channel estimation parameter comprises one or more of a Doppler spread, a delay spread, an antenna imbalance between at least a first antenna and a second antenna, or an antenna correlation between at least the first antenna and the second antenna.

Example 3

The method of example 1 or 2, wherein the communication parameter comprises one or more of a modulation and coding scheme (MCS) or an allocated resource block (RB) size.

Example 4

The method of any of examples 1 through 3, wherein the obtaining the at least one parameter further comprises: determining a respective combined value for the at least one parameter associated with a set of signals communicated over a time window to produce at least one combined parameter, wherein the selecting the transmission mode further comprises: selecting the transmission mode based on the respective combined value for the at least one parameter.

Example 5

The method of any of examples 1 through 4, further comprising: applying a respective weight to the at least one parameter to produce at least one weighted parameter, wherein the selecting the transmission mode further comprises: selecting the transmission mode based on the at least one weighted parameter.

Example 6

The method of any of examples 1 through 5, wherein the at least one parameter comprises a plurality of parameters, each corresponding to a different channel estimation parameter or a different communication parameter, and wherein the selecting the transmission mode further comprises: selecting the transmission mode based on a combination of the plurality of parameters.

Example 7

The method of any of examples 1 through 6, wherein the transmitting the signal using the selected transmission mode further comprises: transmitting the signal on a sidelink to another wireless communication device.

Example 8

A method of wireless communication at a wireless communication device, the method comprising: estimating a Doppler spread; selecting a transmission mode based on the Doppler spread, wherein the transmission mode comprises one of an antenna switch diversity mode or a cyclic delay diversity (CDD) mode; and transmitting a signal using the selected transmission mode.

Example 9

The method of example 8, wherein the estimating the Doppler spread further comprises: measuring a set of Doppler spread values over a time window.

Example 10

The method of example 9, wherein the measuring the set of Doppler spread values further comprises: measuring a respective Doppler spread value of the set of Doppler spread values for each control channel received within the time window.

Example 11

The method of any of examples 8 through 10, wherein the transmitting the signal further comprises: transmitting the signal on a sidelink to another wireless communication device.

Example 12

A method of wireless communication at a wireless communication device, the method comprising: determining a modulation and coding scheme (MCS) utilized for communication by the wireless communication device; selecting a transmission mode based on the MCS, wherein the transmission mode comprises one of an antenna switch diversity mode or a cyclic delay diversity (CDD) mode; and transmitting a signal using the selected transmission mode.

Example 13

The method of example 12, wherein the selecting the transmission mode further comprises: selecting the antenna switch diversity mode when the MCS is less than a threshold; and selecting the CDD mode when the MCS is greater than or equal to the threshold.

Example 14

A method of wireless communication at a wireless communication device, the method comprising: determining an allocated resource block size utilized for communication by the wireless communication device; selecting a transmission mode based on the allocated resource block size, wherein the transmission mode comprises one of an antenna switch diversity mode or a cyclic delay diversity (CDD) mode; and transmitting a signal using the selected transmission mode.

Example 15

The method of example 14, wherein the selecting the transmission mode further comprises: selecting the antenna switch diversity mode when the allocated resource block size is less than a threshold; and selecting the CDD mode when the average allocated resource block size is greater than or equal to the threshold.

Example 16

A method of wireless communication at a wireless communication device, the method comprising: estimating an antenna imbalance between a first antenna and a second antenna; selecting a transmission mode based on the antenna imbalance, wherein the transmission mode comprises one of an antenna switch diversity mode or a cyclic delay diversity (CDD) mode; and transmitting a signal using the selected transmission mode.

Example 17

The method of example 16, wherein the selecting the transmission mode further comprises: selecting the antenna switch diversity mode when the antenna imbalance is less than a threshold; and selecting the CDD mode when the antenna imbalance is greater than or equal to the threshold.

Example 18

A method of wireless communication at a wireless communication device, the method comprising: identifying at least one of a Doppler spread, a modulation and coding scheme (MCS) utilized for communication by the wireless communication device, an allocated resource block size utilized for communication by the wireless communication device, or an antenna imbalance between a first antenna and a second antenna; selecting a transmission mode based on at least one of the Doppler spread, the MCS, the allocated resource block size, or the antenna imbalance, wherein the transmission mode comprises one of an antenna switch diversity mode or a cyclic delay diversity (CDD) mode; and transmitting a signal using the selected transmission mode.

Example 19

The method of example 18, wherein the identifying the at least one of the Doppler spread, the MCS, the allocated resource block size, or the antenna imbalance further comprises: measuring a set of Doppler spread values over a time window.

Example 20

The method of example 19, wherein the measuring the set of Doppler spread values further comprises: measuring a respective Doppler spread value of the set of Doppler spread values for each control channel received within the time window.

Example 21

The method of example 18, wherein the selecting the transmission mode further comprises: selecting the antenna switch diversity mode based on the MCS being less than a threshold; and selecting the CDD mode based on the MCS being greater than or equal to the threshold.

Example 22

The method of example 18, wherein the selecting the transmission mode further comprises: selecting the antenna switch diversity mode based on the allocated resource block size being less than a threshold; and selecting the CDD mode based on the allocated resource block size being greater than or equal to the threshold.

Example 23

The method of example 18, wherein the selecting the transmission mode further comprises: selecting the antenna switch diversity mode based on the antenna imbalance being less than a threshold; and selecting the CDD mode based on the antenna imbalance being greater than or equal to the threshold.

Example 24

The method of any of examples 18 through 23, wherein the transmitting the signal further comprises: transmitting the signal on a sidelink to another wireless communication device.

Example 25

A wireless communication device in a wireless communication network comprising a transceiver, a memory, and a processor coupled to the transceiver and the memory, the processor and memory configured to perform a method of any one of examples 1 through 24.

Example 26

A wireless communication device in a wireless communication network comprising at least one means for performing a method of any one of examples 1 through 24.

Example 27

An article of manufacture for use by a wireless communication device in a wireless communication network comprising a non-transitory computer-readable medium having stored therein instructions executable by one or more processors of the wireless communication device to perform a method of any one of examples 1 through 24.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, and 5 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication at a wireless communication device, the method comprising:
    obtaining a plurality of parameters associated with communication by the wireless communication device over a wireless channel, wherein each of the plurality of parameters corresponds to a different channel estimation parameter associated with the wireless channel or a different communication parameter associated with at least one communication on the wireless channel;
    selecting a transmission mode based on a combination of the plurality of parameters, wherein the transmission mode comprises one of an antenna switch diversity mode or a cyclic delay diversity (CDD) mode; and
    transmitting a signal using the selected transmission mode.

2. The method of claim 1, wherein the channel estimation parameter comprises one or more of a Doppler spread, a delay spread, an antenna imbalance between at least a first antenna and a second antenna, or an antenna correlation between at least the first antenna and the second antenna.

3. The method of claim 1, wherein the communication parameter comprises one or more of a modulation and coding scheme (MCS) or an allocated resource block (RB) size.

4. The method of claim 1, wherein the obtaining the plurality of parameters further comprises:
    determining a respective combined value for at least one parameter of the plurality of parameters associated with a set of signals communicated over a time window to produce at least one combined parameter, wherein the selecting the transmission mode further comprises:
    selecting the transmission mode based on the respective combined value for the at least one parameter.

5. The method of claim 1, further comprising:
    applying a respective weight to each of the plurality of parameters to produce a plurality of weighted parameters, wherein the selecting the transmission mode further comprises:
    selecting the transmission mode based on the plurality of weighted parameters.

6. The method of claim 1, wherein the transmitting the signal using the selected transmission mode further comprises:

transmitting the signal on a sidelink to another wireless communication device.

7. A wireless communication device in a wireless communication network, comprising:

a transceiver coupled to at least a first antenna and a second antenna;

a memory; and a processor coupled to the transceiver and the memory, wherein the processor and the memory are configured to:

obtain a plurality of parameters associated with communication by the wireless communication device over a wireless channel, wherein each of the plurality of parameters corresponds to a different channel estimation parameter associated with the wireless channel or a different communication parameter associated with at least one communication on the wireless channel;

select a transmission mode based on a combination of the plurality of parameters, wherein the transmission mode comprises one of an antenna switch diversity mode or a cyclic delay diversity (CDD) mode; and transmit a signal using the selected transmission mode via the transceiver.

8. The wireless communication device of claim 7, wherein the channel estimation parameter comprises one or more of a Doppler spread, a delay spread, an antenna imbalance between at least the first antenna and the second antenna, or an antenna correlation between at least the first antenna and the second antenna.

9. The wireless communication device of claim 7, wherein the communication parameter comprises one or more of a modulation and coding scheme (MCS) or an allocated resource block (RB) size.

10. The wireless communication device of claim 7, wherein the processor and the memory are further configured to:

determine a respective combined value for at least one parameter of the plurality of parameters associated with a set of signals communicated over a time window to produce at least one combined parameter; and select the transmission mode based on the respective combined value for the at least one parameter.

11. The wireless communication device of claim 7, wherein the processor and the memory are further configured to:

apply a respective weight to each of the plurality of parameters to produce a plurality of weighted parameters; and select the transmission mode based on the plurality of parameters.

12. The wireless communication device of claim 7, wherein the processor and the memory are further configured to transmit the signal on a sidelink to another wireless communication device.

13. A wireless communication device in a wireless communication network, comprising:

means for obtaining a plurality of parameters associated with communication by the wireless communication device over a wireless channel, wherein each of the plurality of parameters corresponds to a different channel estimation parameter associated with the wireless channel or a different communication parameter associated with at least one communication on the wireless channel;

means for selecting a transmission mode based on a combination of the plurality of parameters, wherein the transmission mode comprises one of an antenna switch diversity mode or a cyclic delay diversity (CDD) mode; and means for transmitting a signal using the selected transmission mode.

14. The wireless communication device of claim 13, wherein the channel estimation parameter comprises one or more of a Doppler spread, a delay spread, an antenna imbalance between at least a first antenna and a second antenna, or an antenna correlation between at least the first antenna and the second antenna.

15. The wireless communication device of claim 13, wherein the communication parameter comprises one or more of a modulation and coding scheme (MCS) or an allocated resource block (RB) size.

16. The wireless communication device of claim 13, wherein the means for obtaining plurality of parameters further comprises:

means for determining a respective combined value for at least one parameter of the plurality of parameters associated with a set of signals communicated over a time window to produce at least one combined parameter, wherein the means for selecting the transmission mode further comprises:

means for selecting the transmission mode based on the respective combined value for the at least one parameter.

17. The wireless communication device of claim 13, further comprising:

means for applying a respective weight to each of the plurality of parameters to produce a plurality of weighted parameters, wherein the means for selecting the transmission mode further comprises:

means for selecting the transmission mode based on the plurality of weighted parameters.

18. The wireless communication device of claim 13, wherein the means for transmitting the signal using the selected transmission mode further comprises:

means for transmitting the signal on a sidelink to another wireless communication device.

19. A non-transitory computer-readable medium having stored therein instructions executable by one or more processors of a wireless communication device to:

obtain a plurality of parameters associated with communication by the wireless communication device over a wireless channel, wherein each of the plurality of parameters corresponds to a different channel estimation parameter associated with the wireless channel or a different communication parameter associated with at least one communication on the wireless channel;

select a transmission mode based on a combination of the plurality of parameters, wherein the transmission mode comprises one of an antenna switch diversity mode or a cyclic delay diversity (CDD) mode; and transmit a signal using the selected transmission mode.

20. The non-transitory computer-readable medium of claim 19, wherein the channel estimation parameter comprises one or more of a Doppler spread, a delay spread, an antenna imbalance between at least a first antenna and a second antenna, or an antenna correlation between at least the first antenna and the second antenna.

21. The non-transitory computer-readable medium of claim 19, wherein the communication parameter comprises one or more of a modulation and coding scheme (MCS) or an allocated resource block (RB) size.

22. The non-transitory computer-readable medium of claim 19, wherein the non-transitory computer-readable medium further has stored therein instructions executable by the one or more processors of the wireless communication device to:
- determine a respective combined value for at least one parameter of the plurality of parameters associated with a set of signals communicated over a time window to produce at least one combined parameter; and
- select the transmission mode based on the respective combined value for the at least one parameter.

23. The non-transitory computer-readable medium of claim 19, wherein the non-transitory computer-readable medium further has stored therein instructions executable by the one or more processors of the wireless communication device to:
- apply a respective weight to each of the plurality of parameters to produce a plurality of weighted parameters; and
- select the transmission mode based on the plurality of weighted parameters.

24. The non-transitory computer-readable medium of claim 19, wherein the non-transitory computer-readable medium further has stored therein instructions executable by the one or more processors of the wireless communication device to:
- transmit the signal on a sidelink to another wireless communication device.

* * * * *